(12) United States Patent
Brochman

(10) Patent No.: US 10,919,080 B1
(45) Date of Patent: Feb. 16, 2021

(54) TUBING BENDER

(71) Applicant: Brochman Innovations, LLC, White Bear Lake, MN (US)

(72) Inventor: Todd Brochman, White Bear Lake, MN (US)

(73) Assignee: Brochman Innovations, LLC, White Bear Lake, MN (US)

( * ) Notice: Subject to any disclaimer, the term of this patent is extended or adjusted under 35 U.S.C. 154(b) by 0 days.

(21) Appl. No.: 16/875,481

(22) Filed: May 15, 2020

Related U.S. Application Data

(60) Provisional application No. 62/954,244, filed on Dec. 27, 2019, provisional application No. 63/001,905, filed on Mar. 30, 2020.

(51) Int. Cl.
*B21D 7/06* (2006.01)
*B21D 7/12* (2006.01)
*B21D 7/16* (2006.01)
*B21D 7/14* (2006.01)

(52) U.S. Cl.
CPC ............ *B21D 7/06* (2013.01); *B21D 7/12* (2013.01); *B21D 7/14* (2013.01); *B21D 7/16* (2013.01)

(58) Field of Classification Search
CPC . B21D 7/00; B21D 7/02; B21D 7/021; B21D 7/024; B21D 7/06; B21D 7/14; B21D 7/12; B21D 7/16
See application file for complete search history.

(56) References Cited

U.S. PATENT DOCUMENTS

| D173,830 | S | 1/1955 | Bergman |
| 2,709,382 | A * | 5/1955 | Safranski ............... B21D 7/063 |
| | | | 72/459 |
| D188,003 | S | 5/1960 | Curtiss |
| 3,130,633 | A * | 4/1964 | Rantsch ................ B23Q 17/24 |
| | | | 356/144 |

(Continued)

FOREIGN PATENT DOCUMENTS

| CN | 107350316 A | 11/2017 |
| DE | 4319591 A1 | 10/1994 |

(Continued)

OTHER PUBLICATIONS

"Sales Brochure," actoolsupply.com, accessed Sep. 2018, 2 pages.

(Continued)

*Primary Examiner* — Edward T Tolan
(74) *Attorney, Agent, or Firm* — Patterson Thuente Pedersen, P.A.

(57) ABSTRACT

A compact, lightweight, portable tubing bender configured to enable one-handed operation. The tubing bender includes a portable housing including a handle portion, a bender shoe operably coupled to the portable housing, the bender shoe defining an arcuate channel configured to restrain a length of tubing along a prescribed arc during bending operations, a guide gear fixedly coupled to the bender shoe, and a guide frame pivotably coupled to the bender shoe, the guide frame including a motor, a driven gear and a guide member, the motor configured to drive the driven gear along the guide gear to pivot the guide frame relative to the bender shoe, so as to move the guide member during bending operations to guide the length of tubing along the arcuate channel of the bender shoe.

27 Claims, 14 Drawing Sheets

(56) References Cited

U.S. PATENT DOCUMENTS

| | | | | |
|---|---|---|---|---|
| 3,336,779 A * | 8/1967 | Schall | ................... | B21D 7/063 72/217 |
| 3,680,347 A | 8/1972 | Schenck et al. | | |
| 3,785,190 A * | 1/1974 | Schall | ................... | B21D 7/024 72/149 |
| 3,824,835 A * | 7/1974 | Jackson | ................... | B21D 7/06 72/389.9 |
| 3,828,602 A * | 8/1974 | Leithiser | ................... | B21D 7/06 72/383 |
| 3,889,508 A | 6/1975 | Sugita | | |
| 4,249,407 A * | 2/1981 | Fogleman | .............. | B21D 7/022 72/159 |
| 4,269,056 A * | 5/1981 | Kozinski | ................ | B21D 7/063 72/459 |
| 4,442,695 A | 4/1984 | Gardner | | |
| 4,452,064 A | 6/1984 | Custin | | |
| 4,622,837 A | 11/1986 | Bergman | | |
| 4,760,727 A * | 8/1988 | Van Landingham | .. | B21D 7/024 72/149 |
| 4,827,755 A | 5/1989 | Strybel | | |
| 4,843,858 A | 7/1989 | Grimm et al. | | |
| 4,926,672 A | 5/1990 | Swanson | | |
| 5,022,249 A * | 6/1991 | Caporusso | ............. | B21D 7/024 72/149 |
| 5,056,347 A | 10/1991 | Wagner | | |
| D326,395 S | 5/1992 | Aulgur | | |
| 5,203,192 A * | 4/1993 | Kimura | ................. | B21D 11/12 72/21.3 |
| 5,301,530 A | 4/1994 | Beelen et al. | | |
| 5,305,223 A * | 4/1994 | Saegusa | ................... | B21D 7/12 700/165 |
| 5,727,419 A | 3/1998 | Walsten | | |
| D410,658 S | 6/1999 | Walsten | | |
| 6,026,668 A | 2/2000 | Oda et al. | | |
| 6,463,780 B1 | 10/2002 | Kalanish | | |
| 6,609,405 B1 | 8/2003 | Bates et al. | | |
| 7,024,905 B1 * | 4/2006 | Carlson | ................... | B21D 7/022 72/217 |
| 7,143,629 B1 | 12/2006 | Chiu | | |
| 7,234,338 B2 | 6/2007 | Mirtz et al. | | |
| 7,293,362 B2 | 11/2007 | Konen | | |
| 7,900,495 B2 | 3/2011 | Latoria | | |
| D645,061 S | 9/2011 | Plummer | | |
| 8,333,097 B1 | 12/2012 | Frear | | |
| 8,438,955 B2 | 5/2013 | Wilson, Jr. et al. | | |
| 8,511,131 B2 * | 8/2013 | Latoria | ................... | B21F 1/00 72/389.2 |
| 8,991,229 B1 | 3/2015 | Cheng | | |
| 9,156,075 B2 | 10/2015 | Houle et al. | | |
| 9,662,698 B2 | 5/2017 | Chuang | | |
| 9,718,108 B2 | 8/2017 | Latoria | | |
| 9,968,976 B2 | 5/2018 | Klinger | | |
| 10,441,984 B1 | 10/2019 | Brochman | | |
| 10,518,310 B2 | 12/2019 | Tang et al. | | |
| D872,602 S | 1/2020 | Doeren | | |
| 2008/0190164 A1 | 8/2008 | Boon et al. | | |
| 2009/0188291 A1 | 7/2009 | Itrich et al. | | |
| 2011/0000273 A1 | 1/2011 | Latoria | | |
| 2013/0180053 A1 | 7/2013 | Rubin et al. | | |
| 2017/0274437 A1 | 9/2017 | Klinger | | |
| 2020/0222962 A1 | 7/2020 | Brochman | | |

FOREIGN PATENT DOCUMENTS

| | | |
|---|---|---|
| EP | 0350457 A2 | 1/1990 |
| FR | 2387703 A1 | 11/1978 |
| GB | 2228221 A | 8/1990 |
| JP | S54159375 A | 12/1979 |
| WO | WO-2020097001 A1 | 5/2020 |
| WO | WO-2020097007 A1 | 5/2020 |

OTHER PUBLICATIONS

Application and File History for U.S. Appl. No. 16/247,211, filed Jan. 14, 2019.Inventors: Brochman.

Search Report and Written Opinion dated Mar. 9, 2020, for PCT Application No. PCT/US2019/059750, 12 pages.

Search Report dated Mar. 24, 2020, for PCT Application No. PCT/US2019/059759, 3 pages.

Written Opinion dated Mar. 24, 2020, for PCT Application No. PCT/US2019/059759, 5 pages.

Youtube, "Tube Bender," Oct. 31, 2-14, retrieved from https://www.youtube.com/watch?v=ScsGGM689vs, on Apr. 20, 2020, 2 pages.

Application and File history for U.S. Appl. No. 16/566,460, filed Jul. 16, 2020. Inventor: Brochman.

Electric bender ROBEND 4000 set Rothenberger ROBEND accessed Dec. 14, 2020, 3 pages.

Portable Cyclone Gardner Bender Portable Cyclone accessed Dec. 14, 2020, 4 pages.

Teal Corporation Bending REMS Curvo accessed Dec. 14, 2020, 5 pages.

* cited by examiner

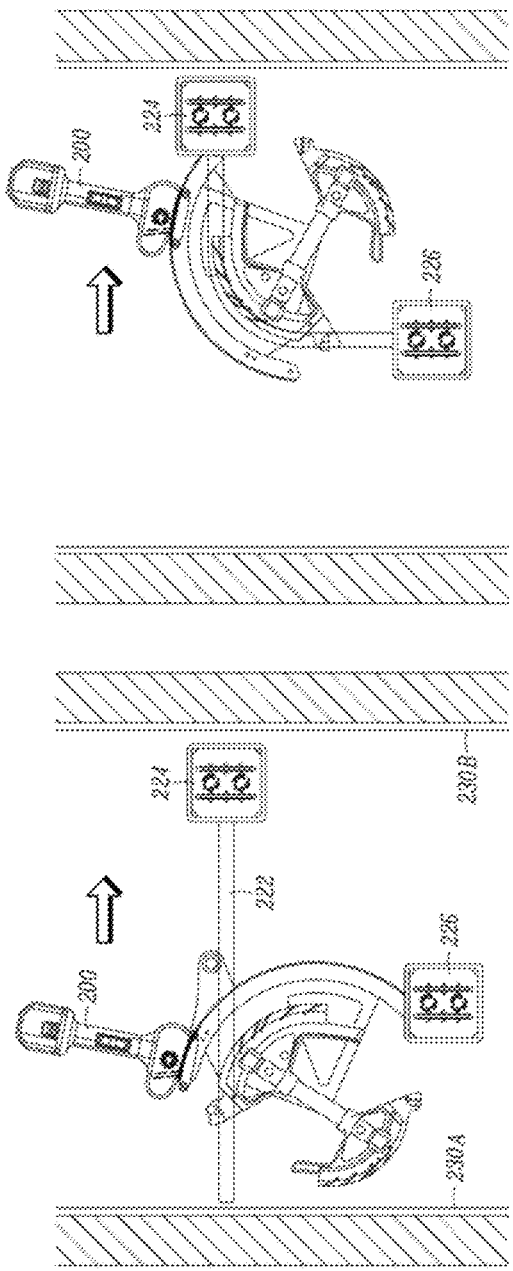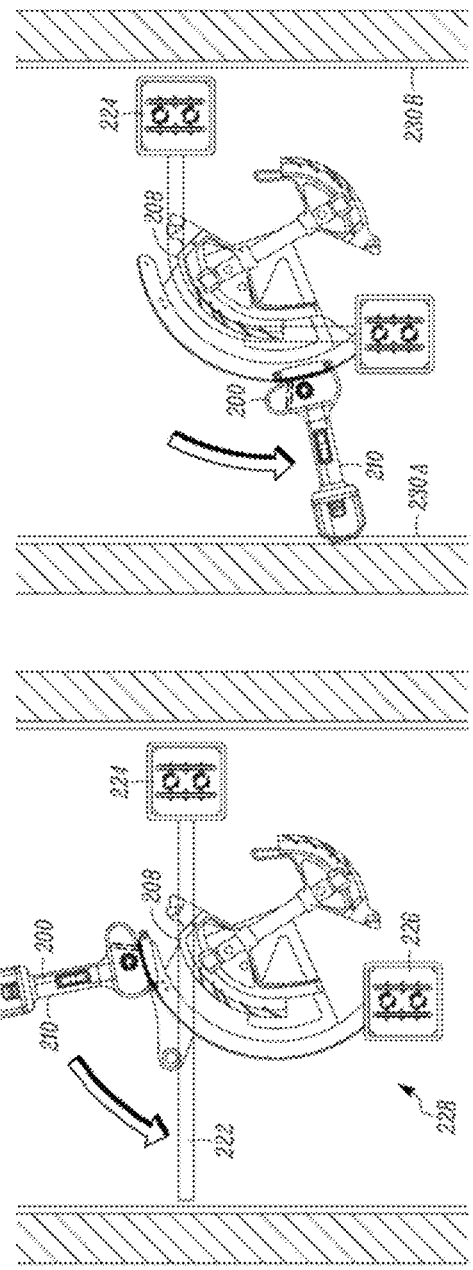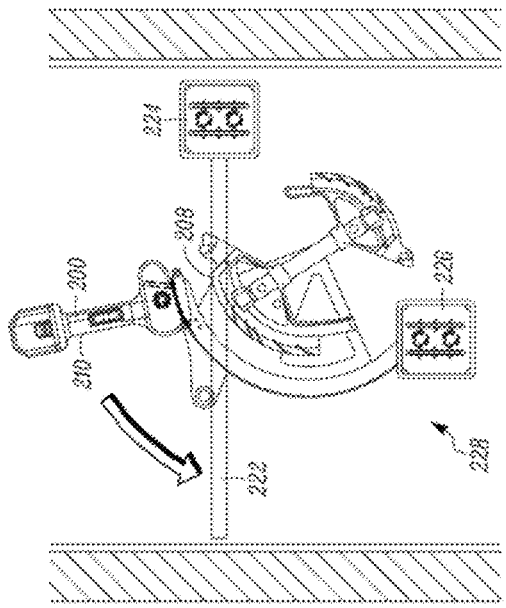

TUBING BENDER

CROSS-REFERENCE TO RELATED APPLICATIONS

The present application claims the benefit of U.S. Provisional Application Nos. 62/954,244 (filed Dec. 27, 2019) and 63/001,905 (filed Mar. 30, 2020), both of which are hereby incorporated herein by reference in their entireties.

TECHNICAL FIELD

The present invention relates generally to tubing benders, and more particularly to powered portable tubing benders.

BACKGROUND

Electrical conduit is a thin-walled tubing used to protect and route electrical wiring in a building or structure. Electrical conduit, often in the form of Electrical Metallic Tubing (EMT), is constructed of straight elongated sections of corrosion resistant galvanized steel of about 3 meters (10 feet) in length, with a diameter of between about 1.2 cm (½ inch) and about 10 cm (4 inches). For example, EMT with standard trade size designations from 1.2 cm (½ inch) to 10 cm (4 inches) is commonly installed by electricians at electrical equipment installation sites in compliance with the U.S. National Electric Code (NEC) and other building codes.

Prior to installation, it is often necessary to bend the conduit. This can be accomplished with a manually operated tool known as a conduit bender, which provides a desired bend in the conduit without collapsing the conduit walls. A typical conduit bender includes a handle and a head. The head is generally a one-piece construction, including an arcuate shoe with a lateral concave channel for supporting the conduit. A hook is generally formed into the head proximate to one end of the channel for engaging a portion of conduit received in the channel. The handle, which is generally about 1 meter (3 feet) long, is secured to the head and is generally positioned in a radial line relative to the arcuate shoe. Such manually operated conduit benders are commonly produced by companies such as Benfield Electric Co., Gardner Bender, Greenlee Tools, Ideal Industries, Klein Tools, and NSI Industries, among others.

To bend the conduit, a length of conduit is positioned on a supporting surface, such as the ground, with a portion of the conduit positioned within the channel of the arcuate shoe, such that the hook of the conduit bender engages the conduit. The handle is then forced to roll the shoe onto the conduit, thereby bending the conduit to fill in the arcuate channel. Accordingly, the use of a manually operated conduit bender requires a stable work surface, as well as space sufficient to manipulate the handle relative to the conduit. For larger size conduit, such as EMT with a designated standard size of about 2.6 cm (1 inch) or greater, the bending may be assisted by an electric, hydraulic or pneumatic motor. Various heavy-duty wheeled or bench mounted benders are produced by companies such as Gardner Bender and Greenlee Tools, among others.

Recent advances in conduit bending have seen an introduction of portable powered conduit benders. Various examples of such powered benders are disclosed in U.S. Pat. Nos. 7,900,495; 9,718,108 and U.S. Patent Publication No. 2009/0188291, assigned to Husky Tools, Inc. Another example of a bending apparatus is disclosed in U.S. Patent Publication No. 2008/0190164.

Installations frequently require the conduit to be routed along the ceiling or parts of a building structure that are normally out of reach when standing on the ground. In such instances, it is common to use a ladder or a lift to safely access the intended conduit route. Without a stable horizontal work surface, it is difficult to operate a manual conduit bender. Further, according to Occupational Safety and Health Administration (OSHA) requirements, electricians must maintain three points of contact on the ladder at all times (e.g., two hands and a foot, or two feet and a hand). Accordingly, most electricians bend conduit on the ground before ascending to the installation location. If it is determined that additional bending is required, the electrician may have to descend back to the ground to conduct additional bending. In some instances, multiple ascents and descents are required to complete the electrical routing, all of which can significantly add to the time and expense of the electrical conduit installation. The present disclosure addresses these concerns.

SUMMARY OF THE DISCLOSURE

The present disclosure provides a compact, lightweight, self-powered, portable, handheld tubing bender system and method of use, thereby enabling the system and method to be held and operated with one hand. A significant reduction in size, particularly in comparison to conventional bending systems, is provided through the inclusion of a motor and reductive gearbox on a pivotable guide frame positioned alongside of a bender shoe and configured to generally pivot along an arc parallel to an arcuate channel defined by the bender shoe. Conventional powered bending systems of the prior art generally rely on a stationary motor and reductive gearbox to rotate an arcuate channel of a bender shoe relative to a heavy fixed frame or housing. By instead using the bender shoe as the fixed frame and rotating the motor and reductive gearbox relative to and alongside the bender shoe a separate heavy fixed frame or housing can be elemental. Doing so enables construction of a much more compact tubing bender system. Especially desirable embodiments of the present disclosure provide a handheld, battery powered motorized tubing bender having a rotatable bearing wheel configured to pivot around a fixed bender shoe.

A further advantage of the portable tubing bender disclosed herein is the ability to bend tubing where a first end of the tubing is fixed in position relative to an installation environment, and without a need to translate or rotate a handle portion of the tubing bender during bending operations. That is, once the tubing bender is positioned relative to the tubing, the bending operations can commence, and the handle (and user grip) can remain fixed in position relative to the installation environment, thereby enabling ease and use, particularly when working in a confined area, overhead, or where the reach of the user may be limited (e.g., on a ladder).

One embodiment of the present disclosure provides a portable tubing bender, including a portable housing, a bender shoe, a guide gear and a guide frame. The portable housing can include a handle portion. The bender shoe can be operably coupled to the portable housing and can define an arcuate channel configured to restrain a length of tubing along a prescribed arc during bending operations. The guide gear can be fixedly coupled to the bender shoe, and can define an arcuate guide path alongside the arcuate channel. The guide frame can be pivotably coupled to the bender shoe, and can include a motor, a driven gear and a guide member. The motor can be configured to drive the driven gear along the guide gear to pivot the guide frame relative to the bender shoe, so as to move the guide member during bending operations to guide the length of tubing along the arcuate channel of the bender shoe.

In one embodiment, the arcuate channel of the bender shoe is configured to receive at least one of Electrical Metallic Tubing (EMT), Rigid Metal Conduit (RMC), Intermediate Metal Conduit (IMC), PVC coated rigid metal conduit, copper tubing, aluminum tubing, stainless steel tubing, tubing used for HVAC or refrigeration systems, tubing used in elevator systems, or other types of tubing or conduit. In one embodiment, the arcuate channel of the bender shoe is configured to receive EMT of a ½-inch designated standard size. In one embodiment, the arcuate channel of the bender shoe is configured to receive EMT of a ¾-inch designated standard size. In one embodiment, the bender shoe is a combination bender shoe defining a plurality of arcuate channels shaped and sized to receive tubing of different diameters. In one embodiment, the bender shoe is configured to pivot relative to the portable housing. In one embodiment, the tubing bender further includes a rechargeable battery configured to power the motor. In one embodiment, the guide frame is configured to complete a 90° bend in less than 10 seconds.

In one embodiment, the output speed of the motor is variable. In one embodiment, the bender shoe includes markings configured to indicate a bend angle of the length of tubing during bending operations. In one embodiment, the portable tubing bender further includes a sensor configured to sense an angular position of the guide frame relative to the bender shoe. In one embodiment, the portable tubing bender includes a programmable controller configured to automatically cease operation of the motor upon reaching a desired angular position, as determined by the sensor. In one embodiment, the portable tubing bender further includes a display configured to display digital readout of an angular position of the guide member relative to the bender shoe. In one embodiment, the display further includes a user interface configured to accept a desired angular position of the guide member relative to the bender shoe.

Another embodiment of the present disclosure provides a method of using a portable tubing bender to bend tubing with a single hand. The method comprises: positioning a length of conduit between a hook and an arcuate channel defined by a bender shoe; pivoting a guide frame relative to the bender shoe, the guide frame including a motor, a driven gear and an arcuate guide gear member, the motor configured to drive the driven gear along the guide gear member fixedly coupled to the bender shoe to pivot the guide frame relative to the bender shoe, so as to move the guide member during bending operations to guide the length of tubing along the arcuate channel of the bender shoe.

Another embodiment of the present disclosure provides a portable tubing bender configured to enable a bending of tubing, where a first end of a length of tubing is fixed in position relative to an installation environment. The portable tubing bender can include a bender shoe/handle portion, handle and guide frame. The bender shoe/handle portion can define an arcuate channel configured to restrain a length of tubing along a prescribed arc during bending operations. The guide frame can be pivotably coupled to the bender shoe, and can be configured to pivot relative to the bender shoe during bending operations to guide a portion of the length of tubing along the arcuate channel of the bender shoe, wherein the bender shoe and handle portion remain fixed in position relative to the installation environment during bending operations.

Another embodiment of the present disclosure provides a method of bending tubing, comprising: positioning a length of tubing between a hook and arcuate channel defined by a bender shoe; and pivoting a guide frame relative to the bender shoe to guide the length of tubing along the arcuate channel of the bender shoe, where in the bender shoe remains fixed in position relative to an installation environment during bending operations.

Another embodiment of the present disclosure provides a reduced length portable tubing bender, including a handle portion, a bender shoe/guide gear, and a guide frame. The bender shoe/guide gear can be operably coupled to the handle portion. The bender shoe can define an arcuate channel configured to restrain length of tubing along a prescribed arc during bending operations. The guide gear can define a central aperture positioned on the handle portion. The guide frame can be pivotably coupled to the bender shoe and can be configured to pivot relative to the bender shoe about the central aperture, so as to guide the length of tubing along the arcuate channel of the bender shoe.

The summary above is not intended to describe each illustrated embodiment or every implementation of the present disclosure. The figures and the detailed description that follow more particularly exemplify these embodiments.

BRIEF DESCRIPTION OF THE DRAWINGS

The disclosure can be more completely understood in consideration of the following detailed description of various embodiments of the disclosure, in connection with the accompanying drawings, in which:

FIG. 14A is a profile view of a portable tubing bender of the prior art positioned on a length of tubing within an installation environment.

FIG. 14B is a profile view of the portable tubing bender of FIG. 14A within the installation environment after commencing a bending operation.

FIG. 15A is a profile view of a portable tubing bender of the prior art positioned on a length of tubing within an installation environment.

FIG. 15B is a profile view of the portable tubing bender of FIG. 15A within the installation environment after commencing a bending operation.

Figure 1:
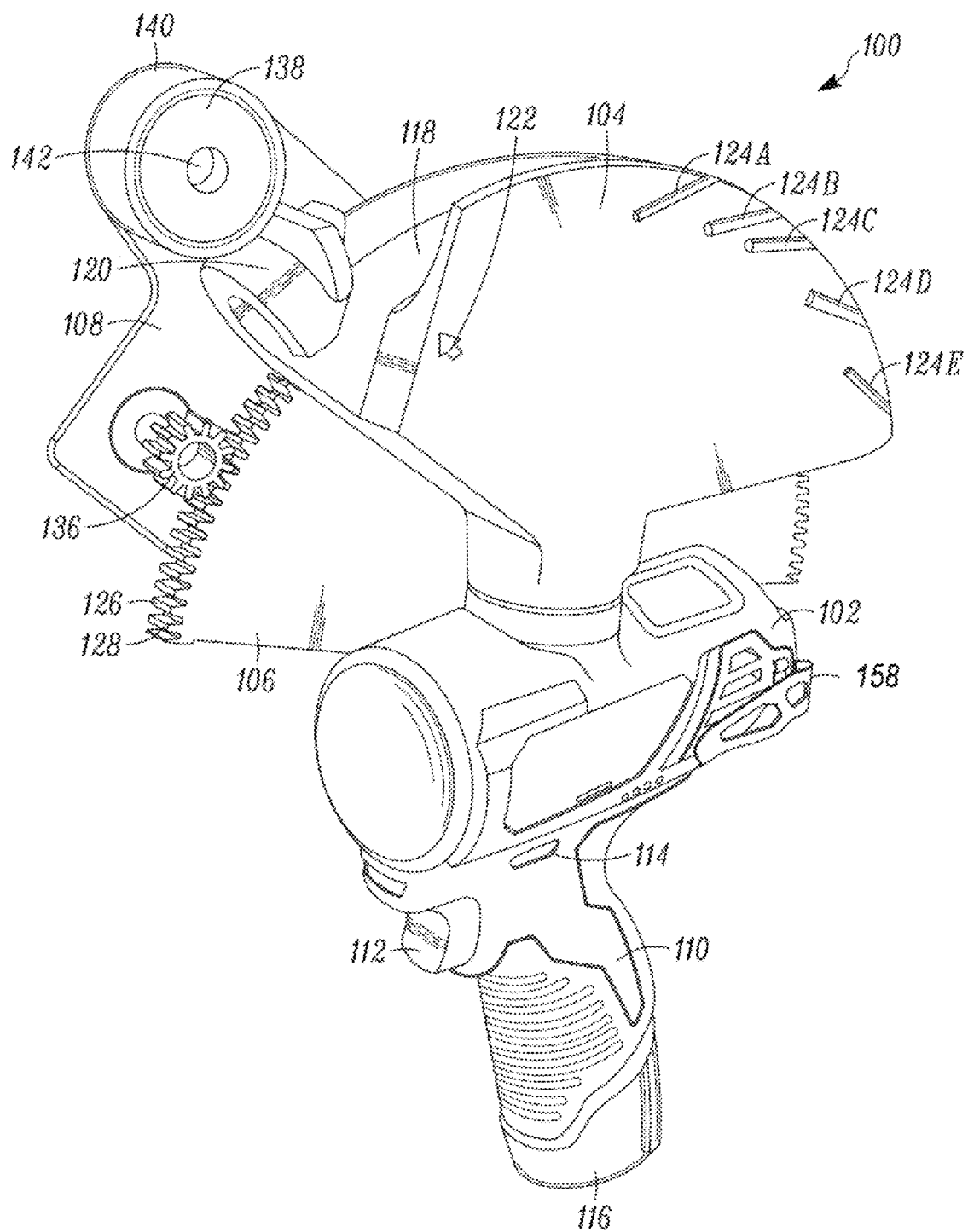
FIG. 1 is a perspective view depicting a portable tubing bender, in accordance with an embodiment of the disclosure.

While embodiments of the disclosure are amenable to various modifications and alternative forms, specifics thereof shown by way of example in the drawings will be described in detail. It should be understood, however, that the intention is not to limit the disclosure to the particular embodiments described. On the contrary, the intention is to cover all modifications, equivalents, and alternatives falling within the spirit and scope of the subject matter as defined by the claims.

DETAILED DESCRIPTION

Figure 2A:
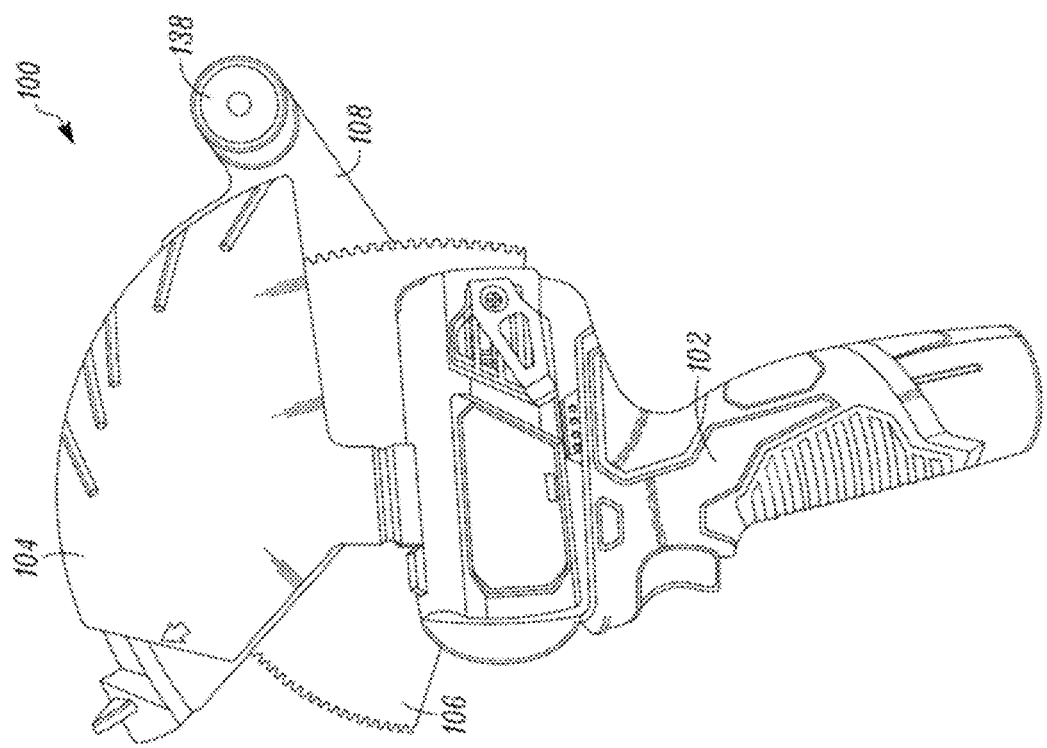
FIG. 2A is a left-side view depicting the portable tubing bender of FIG. 1, with a guide frame in a first position.
Figure 2B:
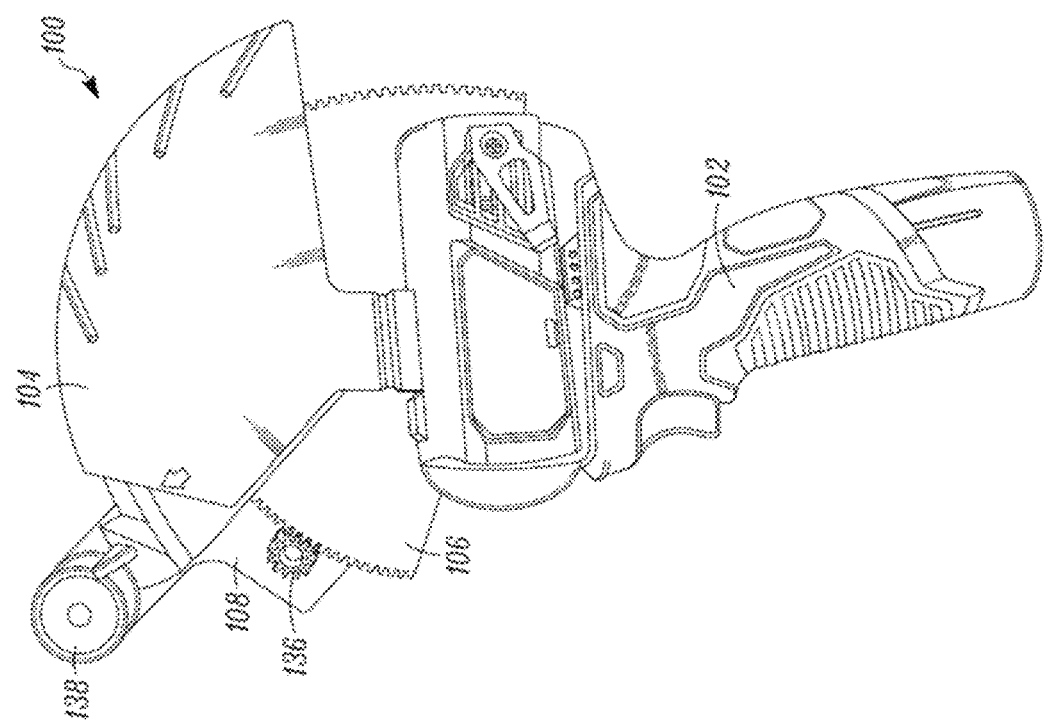
FIG. 2B is a left-side view depicting the portable tubing bender of FIG. 2A, with the guide frame in a second position.
Figure 3:
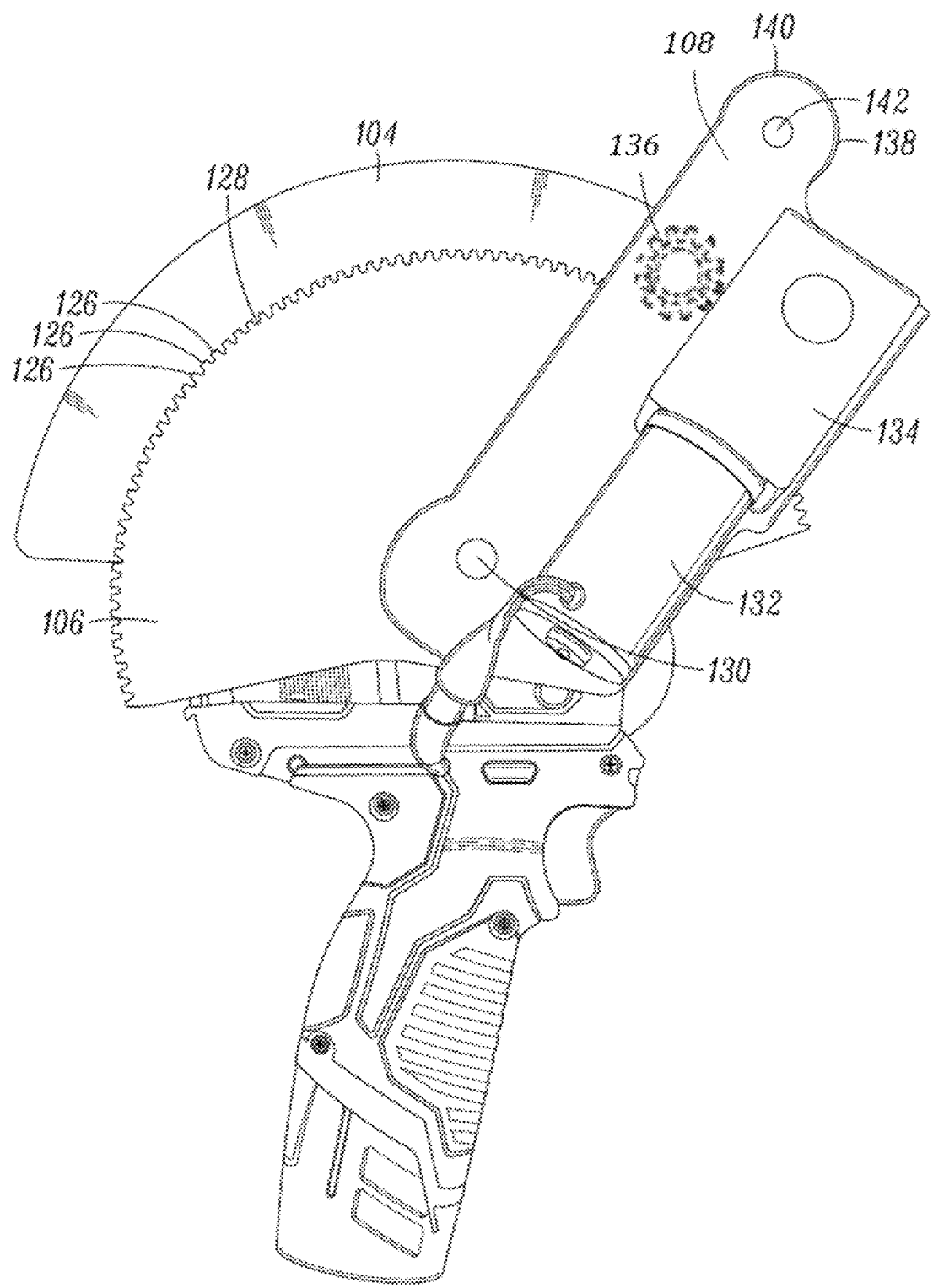
FIG. 3 is a right-side view depicting the portable tubing bender of FIG. 1.

Referring to FIGS. 1-3, a portable tubing bender 100 is depicted in accordance with an embodiment of the disclosure. The portable tubing bender 100 can be configured to enable a user to bend tubing or conduit, such as Electrical Metallic Tubing (EMT), Rigid Metal Conduit (RMC), Intermediate Metal Conduit (IMC), PVC coated rigid metal conduit, copper tubing, aluminum tubing, stainless steel tubing, tubing used for HVAC or refrigeration systems, tubing used in elevator systems, or other types of tubing or conduit, with one hand, for example while standing on a ladder with two feet and grabbing the ladder with the other hand. The tubing bender 100 can be configured to bend tubing or conduit of a number of standard trade size designations (e.g., 0.6 cm (¼ inch), 1 cm (⅜ inch), 1.2 cm (½ inch), 1.9 cm (¾ inch), 2.5 cm (1 inch), 3.2 cm (1¼ inch), 3.8 cm (1½ inch), 5 cm (2 inch), 6.3 cm (2½ inch), 7.6 cm (3 inch), 8.9 cm (3½ inch), 10.2 cm (4 inch, etc.), or generally conduit having a diameter of between about 0.6 cm (¼ inch) and about 10.2 cm (4 inches). The tubing bender 100 can be configured to bend the conduit through a range of angles between about 0° and about 180° over a time span of up to about 60 seconds, depending upon the bend angle desired.

In one embodiment, the portable tubing bender 100 can include a housing 102, a bender shoe 104, a guide gear 106, and a guide frame 108. The housing 102 can generally include a handle portion 110 configured to enable a user to grip and manipulate the tubing bender 100 during use. The housing 102 can further include a trigger 112, forward/reverse switch 114, and other input mechanisms configured to affect user control and manipulation of the guide frame 108 during bending operations. In some embodiments, the housing 102 can be configured to receive a power source 116, such as a rechargeable battery. For example, in one embodiment, the battery can be a rechargeable, lithium-ion, 12-volt battery having a displacement volume of less than about 125 cc (7.5 cubic inches) with a capacity of about 2 to about 9 amperes; although other battery capacities and sizes are also contemplated.

In general, the housing 102 can serve as a lightweight, compact mechanism configured to provide a grip for the bender shoe 104, which in turn serves as a fixed frame of reference around which the guide frame 108 pivots during bending operations. For example, with reference to FIGS. 2A-B, during bending operations, the guide frame 108 can pivot from a first position (as depicted in FIG. 2A) to a second position (as depicted in FIG. 2B). It is to be noted that the positions depicted in FIGS. 2A-B may represent intermediate positions between an initial or starting position when commencing a bend, and a final or completed position after the desired bend angle of tubing positioned in the bender shoe has been achieved.

Various embodiments of the housing 102 are contemplated. In one embodiment, the housing 102 can be a portion of an existing cordless driver, for example, a cordless driver produced by companies and under trademarks such as STANLEY BLACK & DECKER (e.g., DEWALT, STANLEY, BLACK & DECKER, BOSTITCH, CRAFTSMEN, VIDMAR, MAC TOOLS, IRWIN, LENOX, PROTO, PORTER-CABLE, POWERS FASTENERS, LISTA, SIDCHROME, EMGLO, and USAG), TECHTRONICS INDUSTRIES CO. LTD. (e.g., MILWAUKEE ELECTRIC TOOL CO., RYOBI, RIDGID, EMPIRE LEVEL, HOOVER, DIRT DEVIL, ORRICK, STILETTO TOOLS, HEART TOOLS, HOME LIFE, VAX, and AEG), CHEVRON (e.g., EGO, SKILSAW, SKIL, FLEX, DEVON, XTRON, CALMDURA, AND KOBALT), BOSCH (E.G., BOSCH, FREUD, DIABLO, DREMEL, ROTOZIP, VERMONT AMERICAN, and CST/BERGER), HUSQVARNA (e.g., HUSQVARNA, POULAN PRO, WEED EATER, JONSORED, KLIPPO, ZENOAH, GARDENA, DIAMANT BOART, FLYMO, and MCCULLOCK), JPW INDUSTRIES (e.g., JET, POWERMATIC, WILTON, EDWARDS, PROMAC, TOOL AIR, and GYS), APEX TOOL GROUP (e.g., WELLER, WISS, GEARWRENCH, CRESCENT, LUFKIN, JOBOX, APEX, CAMPBELL, NICHOLSON, JACOBS, XCELITE, MASTER POWER, BELZER, HKP, SATA, DOTCO, and CLECO), AND EMERSON (e.g., RIDGID, GREENLEE, INSINKERATOR, EMERSON, SENSI, PROTEAM, and KLAUKE), among others. It is noted that the use of one or more components of an existing cordless driver for the production of a portable tubing bender 100 has the effect of significantly reducing the design and manufacturing efforts necessary for production of embodiments of the present disclosure by one of the aforementioned companies.

The bender shoe 104 can be operably coupled to the housing 102. As depicted in FIG. 1, the bender shoe 104 can define an arcuate channel 118 configured to restrain a length of tubing along a prescribed arc during bending operations.

For example, the arcuate channel 118 can define a convex arc corresponding to an NEC approved bend radius for conduit of a standard trade size. Accordingly, in one embodiment, the size of the bender shoe 104 can be specific to the size of tubing or conduit to be bent. In one embodiment, different sized bender shoes 104 can be provided for different sized conduit. In one embodiment, the arcuate channel 118 of the bender shoe 104 is configured to receive EMT of a ½-inch designated standard size. In another embodiment, the arcuate channel 118 of the bender shoe 104 is configured to receive EMT of a ¾-inch designated standard size. Arcuate channels 118 configured to receive other diameters and types of tubing are also contemplated.

In one embodiment, the bender shoe 104 can be constructed of a lightweight, rigid material, such as a high-strength plastic or composite, although other materials such as aluminum, magnesium, titanium, and steel are also contemplated. For further weight savings, in some embodiments, the bender shoe 104 can include material cutouts or webbing (not depicted), configured to reduce the overall weight of the bender shoe 104 by removing material unnecessary for support and function of the bender shoe 104. With continued reference to FIG. 1, in some embodiments, the bender shoe 104 can further include a hook 120 configured to engage tubing received within the arcuate channel 118.

In one embodiment, the bender shoe 104 can optionally include markings 122 and 124A-E configured to indicate a bend angle of the tubing relative to the bender shoe 104. For example, the markings 122 can optionally include an arrow (A) to be used with stub, offset or outer marks of saddle bends, as well as a degree scale depicting common bend angles (e.g., 10°, 22.5°, 30°, 45°, 60°, etc.) for offset and saddle bends. Other markings can include a rim notch (not depicted) configured to aid in locating the center of a saddle bend, and a star (not depicted) configured to indicate the back of a 90° bend.

Figure 4:
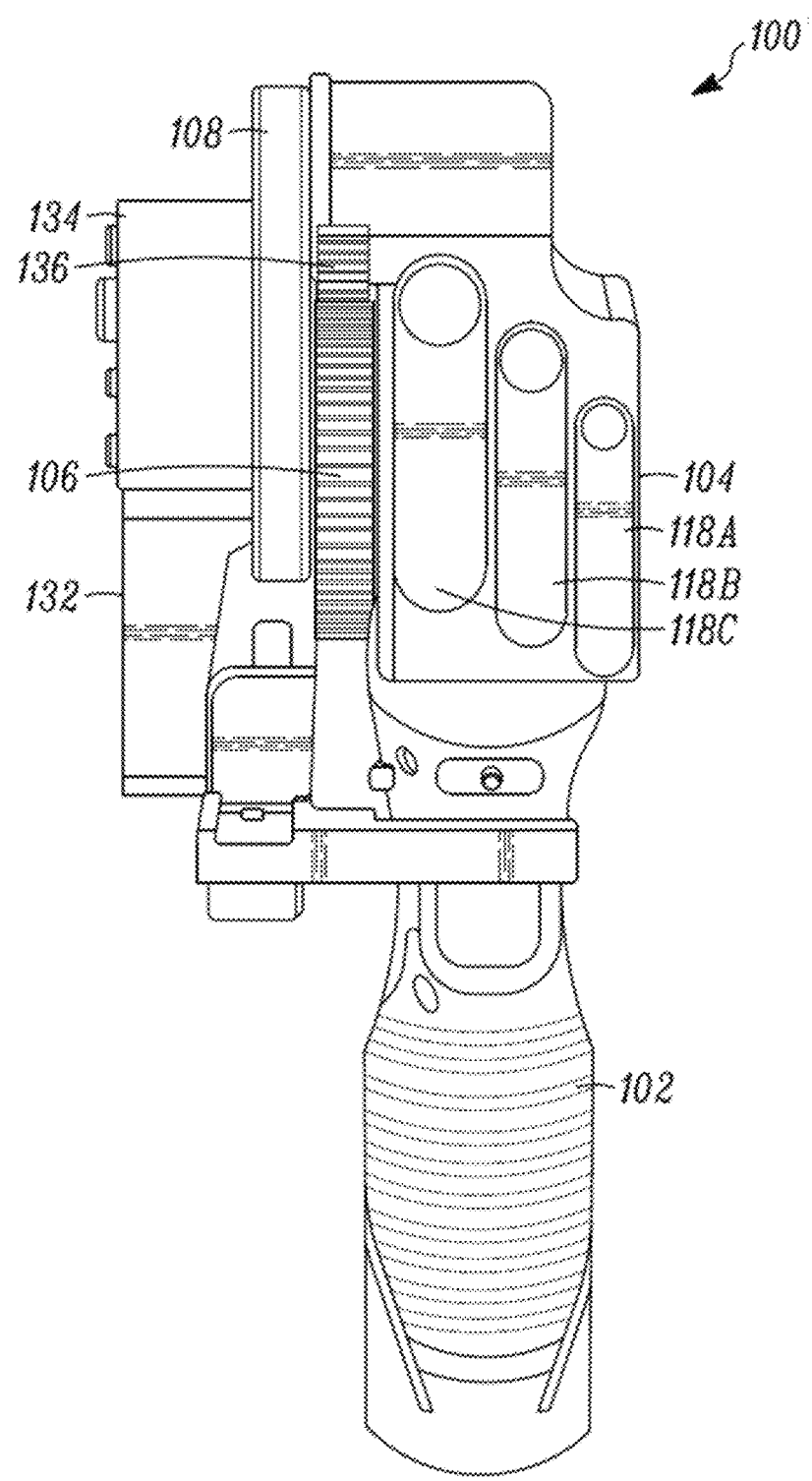
FIG. 4 is a front view depicting a portable tubing bender including a combination bender shoe, in accordance with an embodiment of the disclosure.

Referring to FIG. 4, a combination bender shoe 104 having two or more arcuate channels positioned abreast of one another is depicted in accordance with an embodiment of the disclosure. The combination bender shoe 104 can define a plurality of arcuate channels 118A-C shaped and sized to receive the cross-sections of tubing or conduit of a respective plurality of standard trade sizes. In the example embodiment depicted in FIG. 4, the arcuate channels 118A-C are configured to receive copper tubing having diameters of 6 mm, 8 mm, and 10 mm respectively. In other embodiments, the combination bender shoe 104 can include a first arcuate channel 118A configured to receive ½-inch EMT, and a second arcuate channel 118B configured to receive ¾-inch EMT. Other configurations, including a bender shoe 104 having four or more arcuate channels configured to receive tubing of different diameters, are also contemplated.

Figure 5B:
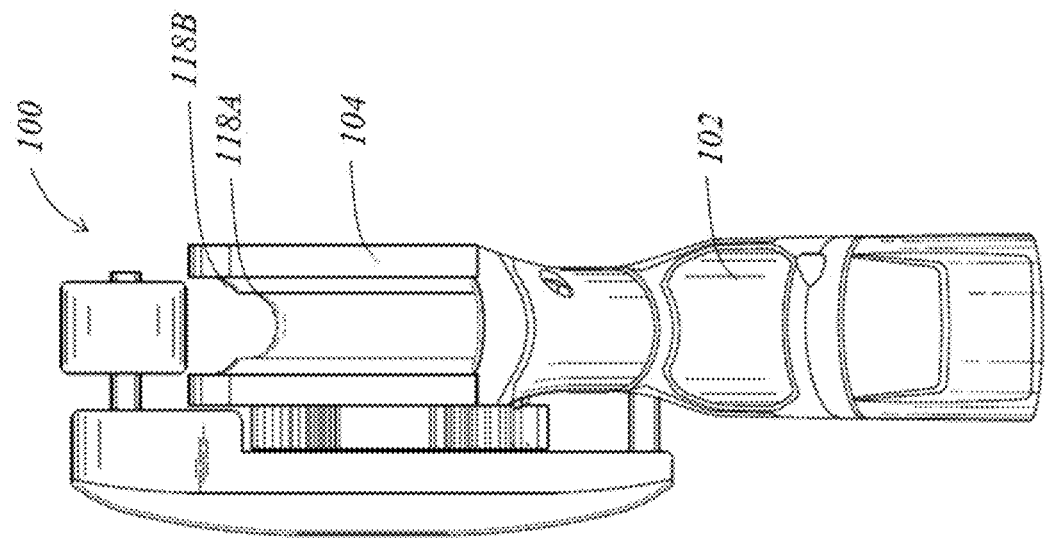
FIG. 5B is a rear side view depicting the portable tubing bender of FIG. 5A.
Figure 5A:
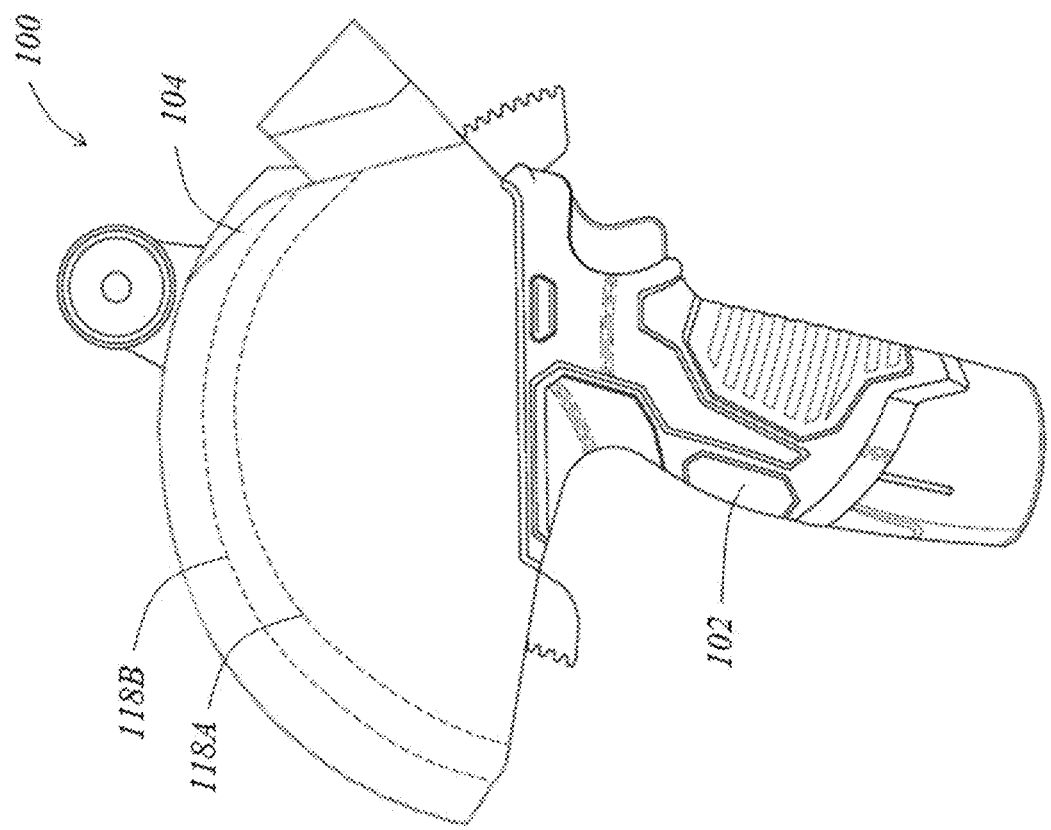
FIG. 5A is a right-side view depicting a portable tubing bender including a combination bender shoe, in accordance with an embodiment of the disclosure.

Referring to FIGS. 5A-B, a combination bender shoe 104 having two or more nested arcuate channels is depicted in accordance with an embodiment of the disclosure. The combination bender shoe 104 can define a plurality of stacked or nested arcuate channels 118A-B, thereby providing a combination bender shoe 104 configured to receive the cross-sections of tubing or conduit of a plurality of standard trade sizes, and guide the tubing or conduit along a bend arc corresponding to the NEC approved bend radius for conduit of the respective standard trade size, without adding additional width to the bender shoe 104 like that of combination bender shoes having two or more arcuate channels positioned side-by-side (e.g., the bender shoe 104 depicted in FIG. 4). For example, in one embodiment, the combination bender shoe 104 can include a first arcuate channel 118A configured to receive ½-inch EMT, embedded within a second arcuate channel 118B configured to receive ¾-inch EMT. Other configurations, including three or more arcuate channels configured to receive tubing of different diameters, are also contemplated. Accordingly, the combination bender shoe 104 can present a lighter weight, more compact combination bender shoe, particularly in comparison to conventional combination bender shoes, such as that depicted in FIGS. 11A and 14A-15B (described in more detail below).

In one embodiment, the bender shoe 104 can be configured to pivot or rotate relative to the housing 102. For example, with reference to FIG. 9, the housing 102 can include a locking pin 125 or other mechanism configured to selectively lock the bender shoe 104 in position relative to the housing 102. Manipulation of the locking pin 125 can enable a user to selectively rotate the bender shoe 104 around a z-axis relative to the housing 102 (e.g., between about 45° and 90°) which may be beneficial when working in a confined area.

With particular reference to FIG. 3, the guide gear 106 can be fixedly coupled to the bender shoe 104. In one embodiment, the guide gear 106 can include the minimum number of teeth 126 necessary to enable the guide frame 108 to pivot through a desired range of motion. Accordingly, in one embodiment, the guide gear 106 can be configured as a sectional gear (e.g., a portion of a circular gear) representing an arc of between about 180° and about 250°, thereby presenting a weight savings over a full 360° circular gear. In one embodiment, the guide gear 106 can include an arc of teeth 126 traversing about 180° around a peripheral edge 128 of the guide gear 106 relative to a central pivot point or axle 130.

In one embodiment, the guide gear 106 can be constructed of a lightweight, rigid material, such as a high-strength plastic or composite, although other materials such as aluminum, magnesium, titanium and steel are also contemplated. In some embodiments, the guide gear 106 and the bender shoe 104 can be formed as a single, unitary component. For example, in one embodiment, the bender shoe 104 can include an arcuate groove or channel (not depicted), one edge or surface of which can define the guide gear 106. For example, a top surface of the groove can define a partial ring gear, having a plurality of teeth facing inwardly along a curved surface. In other embodiments, a bottom surface of the groove can define the guide gear.

Figure 6B:
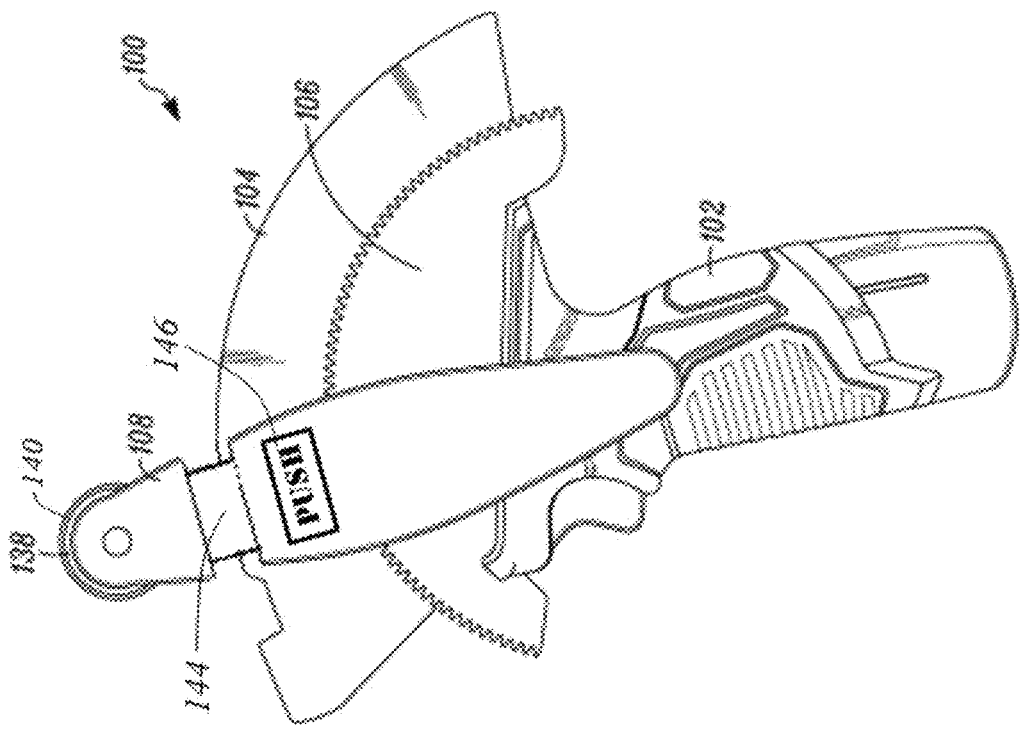
FIG. 6B is a left-side view depicting the portable tubing bender of FIG. 7 in a second position.
Figure 6A:
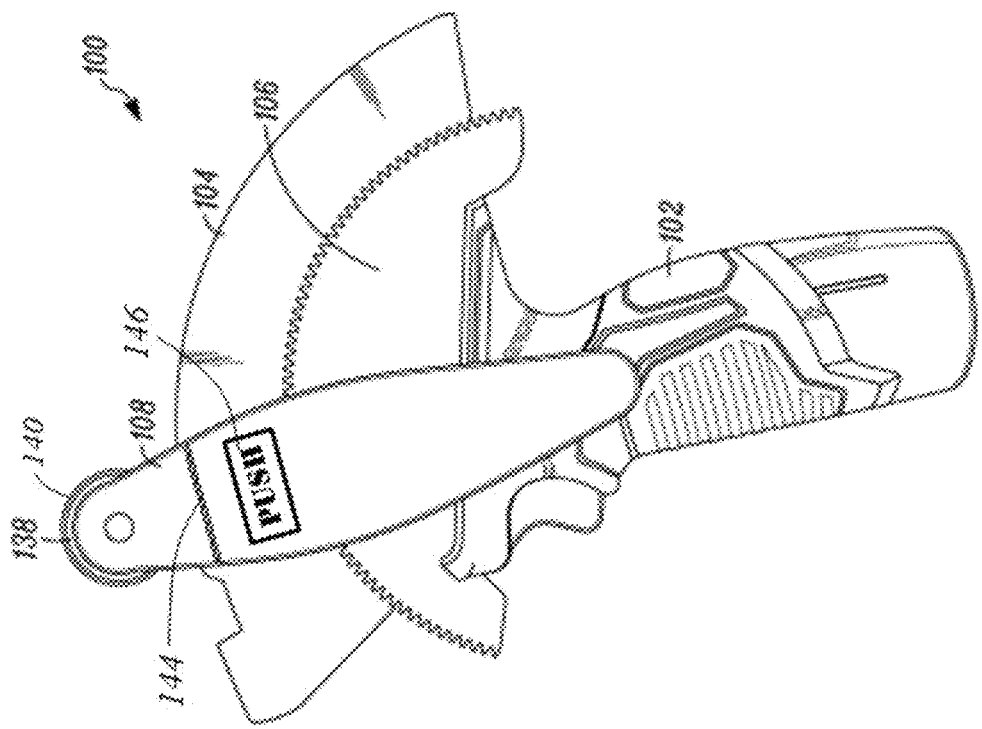
FIG. 6A is a left-side view depicting a portable tubing bender including an adjustable distance bearing wheel in a first position, in accordance with an embodiment of the disclosure.

The guide frame 108 can be pivotably coupled to the guide gear 106/bender shoe 104 to selectively pivot relative to the bender shoe 104 about the central pivot point or axle 130. The guide frame 108 can include a motor 132, an (optional) reductive gearbox 134 including a driven gear 136, and a guide member 138. In some embodiments, the motor 132 and reductive gearbox 134 can be positioned on one side of the guide frame 108 (e.g., opposite to the bender shoe 104), while the driven gear 136 can be positioned on the other side of the guide frame 108 (e.g., adjacent to the bender shoe 104) (as depicted in FIGS. 1-3). In other embodiments, the guide frame 108 can at least partially or fully house the motor 132 and reductive gearbox 134, so as to provide a protective shroud to the motor 132 and reductive gearbox 134 (as depicted in FIGS. 6A-B). In some embodiments, the guide frame 108 can be positioned on the left side of the tubing bender 100 (as viewed by a user gripping housing 102 in its normal position). This may be more convenient for a right-handed user, as it will facilitate a line of sight view of the bender tubing. In other embodiments, the guide frame 108 can be positioned on the right side of the tubing bender 100, an orientation that may be more convenient for a left-handed user.

The motor 132 can be powered by the power source 116 and can be controlled by a plurality of inputs. For example, in one embodiment, the motor 132 can be started, stopped and otherwise controlled for variable speed, duration or both speed and duration via the trigger 112. Forward and reverse directional control of the motor 132 can be controlled via the forward and reverse switch 114. In other embodiments, one or more of actuation, speed, duration, and directional control of the motor 132 can be controlled, at least in part, by a programmable controller (as discussed in greater detail below).

The reductive gearbox 134 can be configured to operably couple an output of the motor 132 to the driven gear 136, thereby reducing the rotational speed of the motor to a desired driven gear speed, while increasing the torque output. The reductive gearbox 134 can be made up of a plurality of different gearing types and configurations to achieve the desired reduction in RPM and corresponding increase in torque necessary to bend conduit. In one embodiment, the reductive gearbox 134 can include a three-stage reductive planetary gear set, with a final worm gear reduction. For example, in one embodiment, the three stage planetary gear set can provide a gear reduction of 188:1, and the final worm gear reduction can provide an additional gear reduction of 24:1. Accordingly, in some embodiments, the output of the motor (which can be 4500 RPM or greater) can be reduced to a driven gear 136 rotational output speed of less than about 1.5 RPM. Accordingly, in some embodiments, the rotational output of the driven gear 136 can be less than about 30 RPM, with a torque output of at least about 55 Nm (500 inch-pounds). In other embodiments, the rotational output of the driven gear 136 can have maximum of about 2 RPM or less, with an output torque of at least 135 Nm (1200 inch-pounds).

In some embodiments, the output torque can be determined according to PTI Lab test procedures for determining relative torque measurements (RTM), or another standardized test for determining relative torque measurements for corded and cordless drills, drills/drivers, and screwdrivers. Whereas a torque output in the range of about 27-40 nm (240-360 inch-pounds) is generally considered high in the cordless tool industry, embodiments of the present disclosure can produce a torque output of at least about 135 nm (1200 inch-pounds). Moreover, embodiments of the present disclosure can produce such torque with a lightweight, 12 VDC battery (e.g., an M12 series battery from Milwaukee Tools, Inc.), and an overall tool weight of about 1100 g or less.

Various tool elements can be operably coupled to the driven gear 136 via a quick release mechanism. Although the tool elements herein are depicted and described as a portable tubing bender attachment, a non-limiting list of other tool elements includes a heavy-duty riveter, metal working brake, sheathing/flashing brake, body shop panel gatherer, replacement for a vise, hydraulic press, millwright assistant (configured to move heavy objects in small increments), lift jack, spreader tool (e.g., similar to a jaws of life), replacement for air tools, welding clamp, vice grip, clippers, tree trimmer, wire cutter, crimping tool, rebar cutter, PVC tubing cutter, steel punch, threaded rod cutter, and portable power take off shaft; other tool elements are also contemplated, especially those that may require very high torque to be slowly applied over a small overall arc of travel.

With specific reference to a portable tubing bender attachment, the guide member 138 can be configured to serve as a guide surface to forcibly urge tubing or conduit into the arcuate channel 118 of the bender shoe 104 during bending operations. In some embodiments, the guide member 138 can be in the form of a bearing wheel 140 received on a shaft 142. Collectively, the motor 132, driven gear 136 and guide member 138 can be operably coupled to the guide frame 108, which can be configured to pivot about the central pivot point or axle 130. Accordingly, the motor 132 can be configured to drive the driven gear 136 along the guide gear 106 to pivot the guide frame 108 relative to the guide gear 106/bender shoe 104, so as to move the guide member 138 during bending operations to guide the tubing along the arcuate channel 118 of the bender shoe 104 during bending operations.

With reference to FIG. 6A-B, in some embodiments, the portable tubing better 100 can optionally include a bearing wheel adjustment mechanism 144 for adjusting a distance of the bearing wheel 140 from the bender shoe 104. For example, in some embodiments, a position of the bearing wheel 140 relative to the housing 102 or bender shoe 104 can be adjusted by manipulating a locking device 146 and manually positioning the bearing wheel 140 at a desired distance from the bender shoe 104. In other embodiments, a position of the bearing wheel 140 relative to the bender shoe 104 can be adjusted by a driver (not depicted), such as an electric motor, like that disclosed in PCT Application Serial No. PCT/US2019/059750, the contents of which are hereby incorporated by reference herein.

Figure 7:
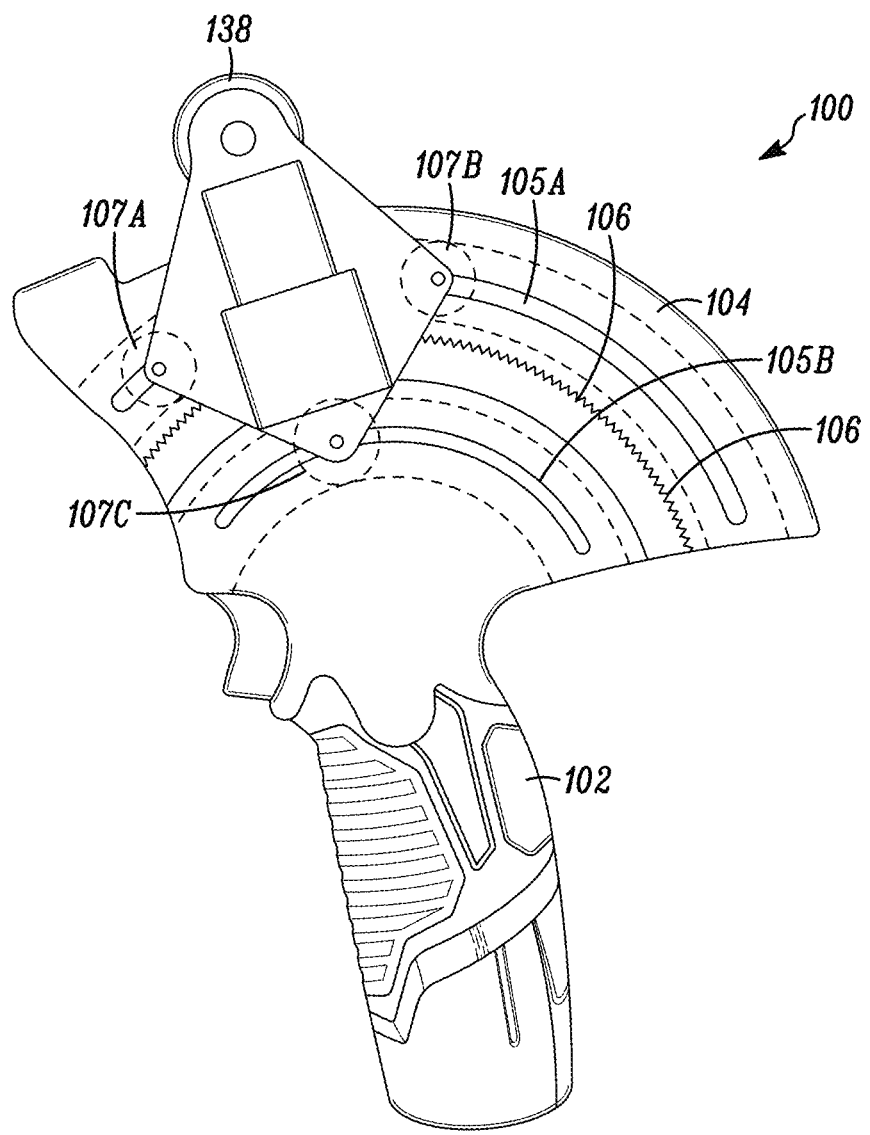
FIG. 7 is a left-side view depicting a portable tubing bender including a bender shoe defining a curved track along which a guide frame can traverse, in accordance with an embodiment of the disclosure.
Figure 8A:
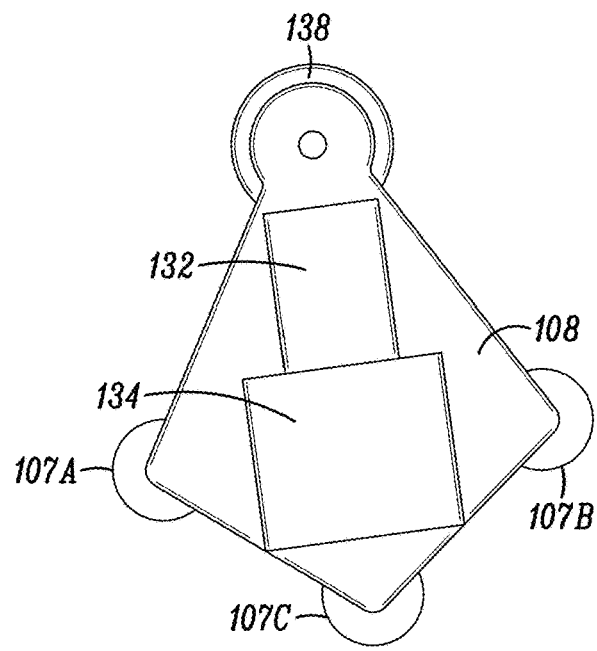
FIG. 8A is a close-up view depicting the guide frame of FIG. 7.
Figure 8B:
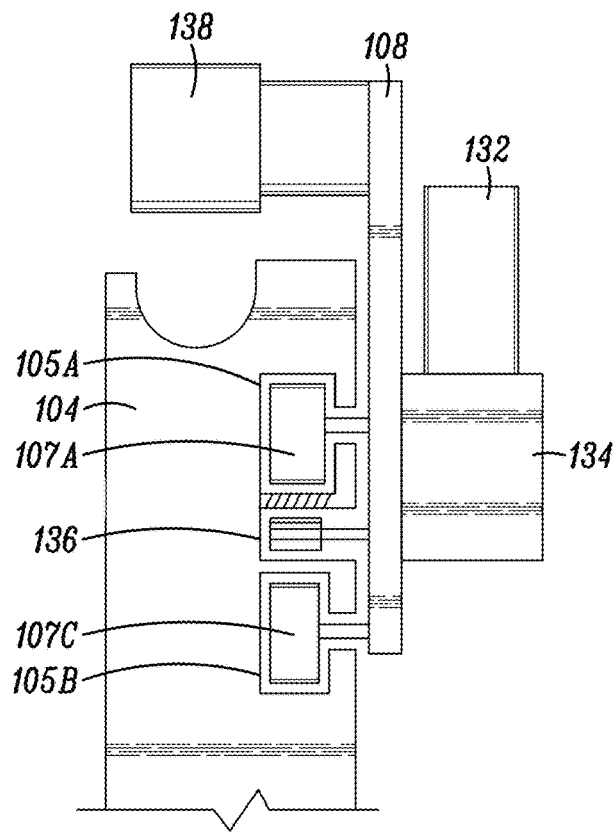
FIG. 8B is a partial, cross sectional view depicting the bender shoe and guide frame of FIG. 7.

In some embodiments, the guide member 138 can be radially restrained with respect to the bender shoe 104, without the need for a pivotable linkage connection between the guide frame 108 and a central pivot point or axle 130 of the bender shoe 104 such as that depicted in FIGS. 1-6. For example, with reference to FIGS. 7-8B, in one embodiment, the guide frame 108 can include a plurality of guide wheels 107A-C configured to traverse along one or more curved guide wheel tracks or channels 105A/B defined within the bender shoe 104. In such embodiments, the guide gear 106 can be formed as a partial ring gear along which the driven gear 136 can traverse, thereby providing a motive force for the guide frame 108 to move along the curved guide wheel channels 105A/B via the guide wheels 107A-C. A motor 132 and reductive gearbox 134 operably coupled to the guide frame 108 can provide rotational power to the driven gear 136. Accordingly, in some embodiments, a further weight savings can be provided through an integrally molded curved guide wheel track 105A/B, thereby eliminating the need for a linkage member pivotably coupling the guide frame 108 to the bender shoe 104.

Figure 9:
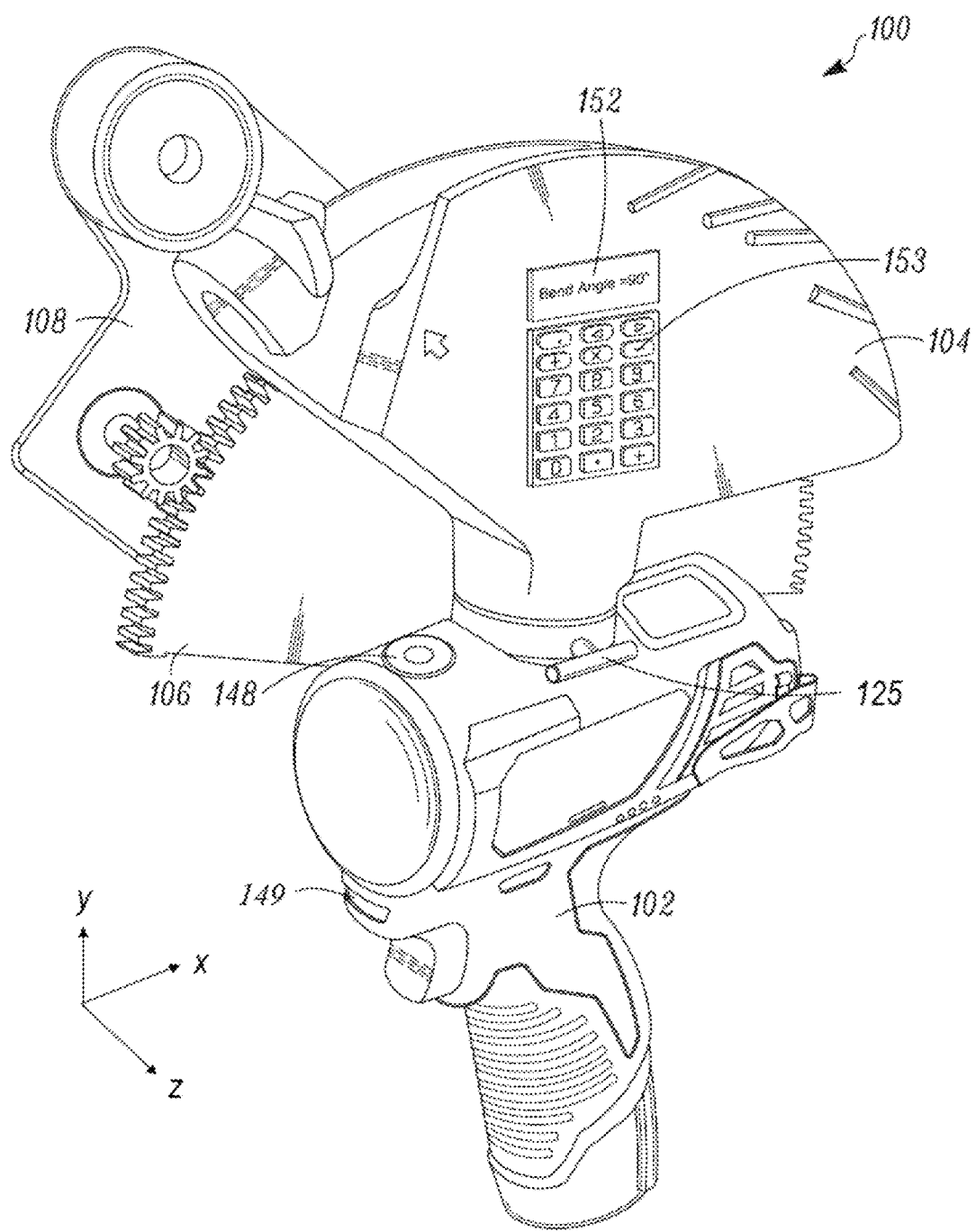
FIG. 9 is a perspective view depicting a portable tubing bender in accordance with an embodiment of the disclosure.

As depicted in FIG. 9, in one embodiment, the portable tubing bender 100 can include a leveling device 148, configured to serve as an aid in leveling the portable tubing bender 100 relative to a gravitational frame of reference along at least one of an x-axis and y-axis. For example, in one embodiment, the leveling device 148 can be a bubble level, such as a bull's-eye bubble level, or some other type of leveling tool, such as a magnetic or electronic level. In some embodiments, the leveling device 148 can be included within a display 152/keypad 153, which in some embodiments can be incorporated into a component of the portable tubing bender 100. In one embodiment, the portable tubing bender 100 can include a work light 149 configured to partially illuminate the work space.

Figure 10:
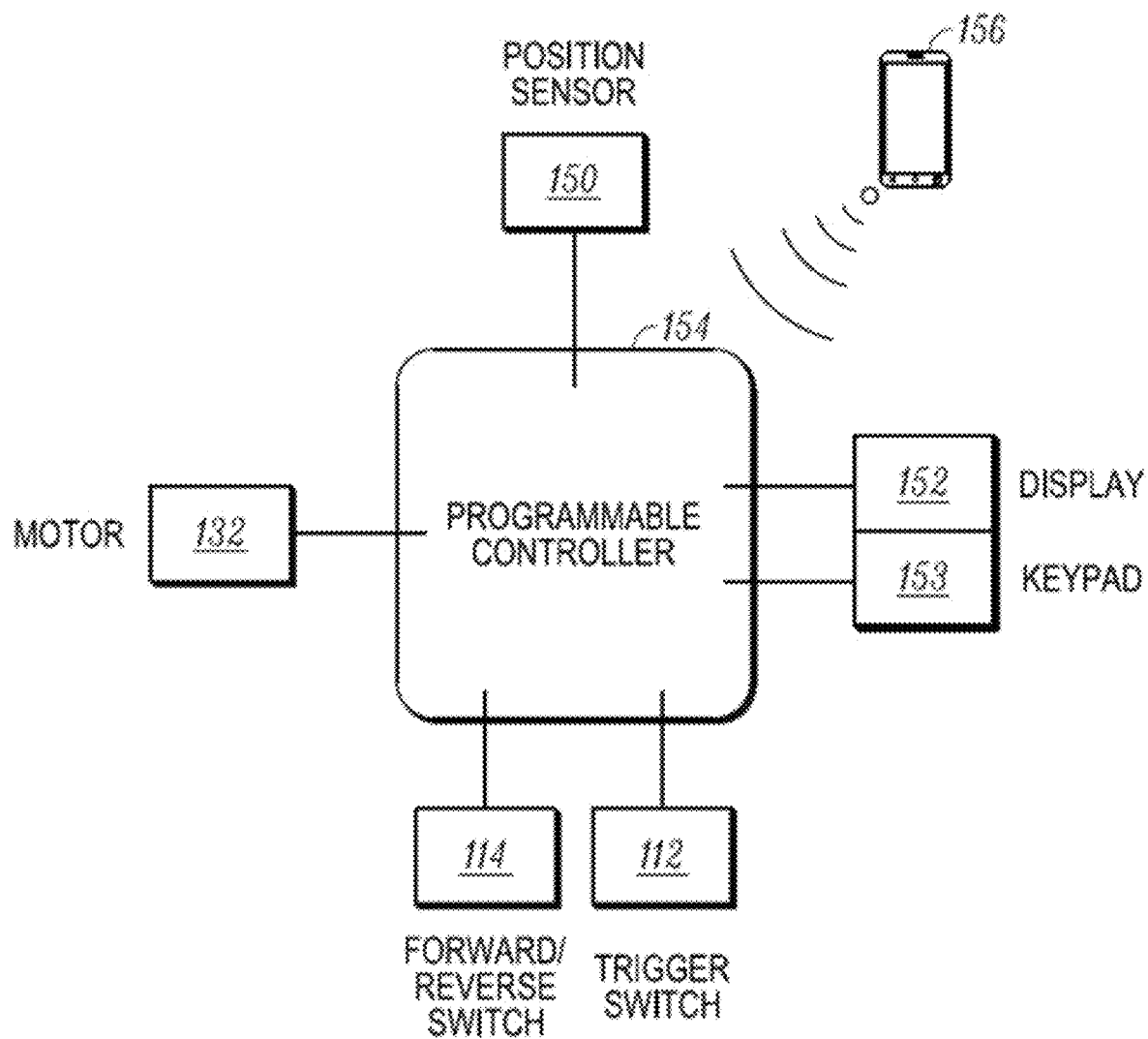
FIG. 10 is a schematic view depicting various electrical components of embodiments of the portable tubing bender, in accordance with the disclosure.

In one embodiment, the portable tubing bender 100 can have angular position sensing capabilities of the rotating components relative to the stationary components. In these embodiments, the portable tubing bender 100 can include an angular position sensor 150 (as depicted in FIG. 10) configured to sense rotation of at least one of the guide frame 108 or guide member 138 relative to the guide gear 106 or bender shoe 104. For example, in one embodiment, the angular position sensor 150 can be operably coupled to the motor 132 or driven gear 136 to provide information regarding the angular position of the rotating components relative to the stationary components.

In some embodiments, the portable tubing bender 100 can be configured to display an angular position of rotating components (e.g., the guide frame 108/guide member 138) relative to stationary components (e.g., the guide gear 106/bender shoe 104) via the display 152. In some embodiments, the motor 132 can be smart (e.g., programmable), such that a user can input a desired bend angle into the keypad 153 or other user interface (e.g., a smart phone or other mobile computing device) coupled to a programmable controller 154 (as depicted in FIG. 9), prior to actuating the motor 132 (e.g., via the trigger 112 or other interface). For example, in one embodiment, a user can use a mobile computing device 156, such as a cellular phone, tablet, or portable computer, in a wired or wireless connection with the programmable controller 154 to transmit information to and receive information from the programmable controller 154.

In one embodiment, a user can use the mobile computing device 156 as an aid in determining one or more dimensions of a space in which conduit is to be installed. For example, in one embodiment, the mobile computing device 156 can be positioned against surfaces within the space, thereby enabling the mobile computing device 156 to record respective positions of each surface in order to develop a three-dimensional model of the space in which the conduit is to be installed. In another embodiment, the mobile computing device 156 can have scanning capabilities configured to detect fixed surfaces within the space to develop a three-dimensional model. For example, in one embodiment, the mobile computing device can use a laser, camera or other optical sensor to detect fixed surfaces within the space. Thereafter, a user of the mobile computing device 156 can determine a desired layout of conduit within the space as well as a corresponding set of conduit bend specifications. The set of conduit bend specifications can include the number and angle of each of the bends required in the various sections or portions of conduit necessary to complete the desired layout. In one embodiment, the mobile computing device 156 or display 152/keypad 153 can include a smart bend calculator configured to determine a multiplier to determine bend spacing, bend angles, and bends in multiple planes (e.g., where one bend is rotated along a longitudinal axis of the conduit with respect to a prior or subsequent bend).

One advantage provided by embodiments of the present disclosure includes a significant reduction in the size of the portable tubing bender 100, particularly in comparison to conventional bending systems of the prior art. In part, a reduction in size of the portable tubing bender 100 is made possible by the inclusion of a motor 132, driven gear 136 and guide member 138 on a pivotable guide frame 108 positioned parallel to, or alongside, of the bender shoe 104, rather than being mounted to a frame or housing to which the bender shoe 104 is pivotably coupled, which is generally the case with conventional tubing benders. This advantage is made clear by a side-by-side comparison of an example conventional tubing bender 200 (specifically the tubing bender disclosed in U.S. Pat. No. 7,900,495) (as depicted in FIG. 11A), with a portable tubing bender 100 of the present disclosure (as depicted in FIG. 11B).

Figure 11B:
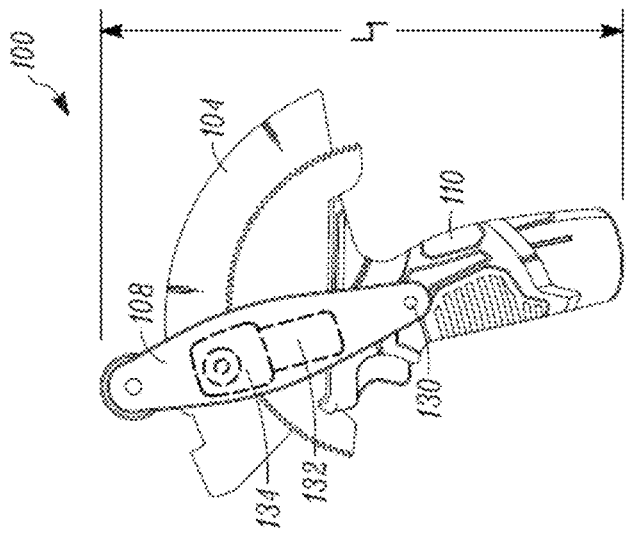
FIG. 11B is profile view depicting a portable tubing bender, in accordance with an embodiment of the disclosure, for a side-by-side size comparison with the portable tubing bender of the prior art of FIG. 11A.
Figure 11A:
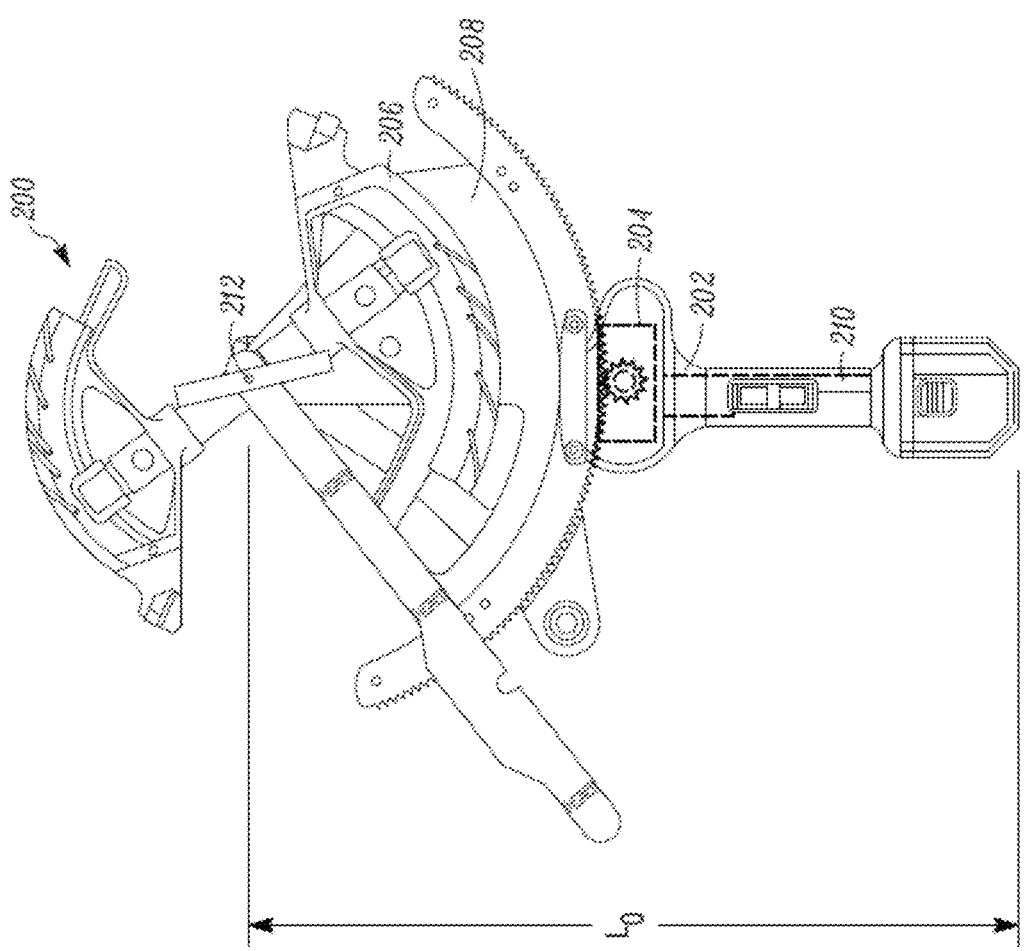
FIG. 11A is a profile view depicting a portable tubing bender of the prior art.

With reference to FIG. 11A, the depicted conventional tubing bender 200 relies on a stationary motor 202 and reductive gearbox 204 to rotate a bender shoe 206 relative to a heavy fixed frame 208. Accordingly, the motor 202 and gearbox 204 (which are incorporated into a handle portion 210) remain fixed in position relative to the frame 208. The bender shoe 206, which is pivotably coupled to the frame 208 at pivot 212, rotates relative to the frame 208. It is noted that while the conventional tubing bender 200 depicted in FIG. 11A includes two opposing bender shoes (e.g., a ¾-inch bender shoe, with an opposing ½-inch bender shoe), a single bender shoe (e.g., ¾-inch bender shoe bender shoe 206) may alternatively be employed.

By contrast, with reference to FIG. 11B, embodiments of the present disclosure eliminate the need for a separate fixed frame, by using the bender shoe 104 itself as the equivalent of a fixed frame operably coupled to the handle portion 110, and rotating the motor 132 and reductive gearbox 134 relative to and alongside the bender shoe 104. Accordingly, as can be seen in FIGS. 11A-B, elimination of the fixed frame and the positioning of the motor 132 and reductive gearbox 134 to pivot generally parallel to and alongside of the bender shoe 104, enables the construction of a more compact, lighter weight device 100.

Specifically, by keeping the bender shoe 104 stationary, embodiments of the present disclosure can be constructed with an overall shorter length (L1), in comparison to an equivalent minimum length (L0) of the tubing bender 200 of the prior art. The overall reduction in length L1 is made possible by positioning a central pivot point or axle 130 of the bender shoe 104 on the handle portion 110 (wherein in the prior art bender shown in FIG. 11A, the central aperture 212 is positioned above the handle portion 210), and by positioning the motor 132 and reductive gearbox 134 in a pivotable guide frame 108 alongside of the bender shoe 104 (wherein in the prior art bender shown in FIG. 11A, the motor 202 and reductive gearbox 204 are positioned in the handle portion 210 below the bender shoe 206).

Further, elimination of the fixed frame 208 in embodiments of the present disclosure (such as is required in the FIG. 11A bender), results in a significant weight savings. The resulting device 100 is a lightweight, compact and well-balanced portable tubing bender. In some embodiments, the portable tubing bender 100 can have an overall weight of less than 2 lbs; although other weights of the portable tubing bender 100 (e.g., less than 3 lbs, less than 4 lbs, less than 6 lbs, less than 8 lbs, less than 10 lbs, less than 12 lbs, less than 14 lbs, less than 16 lbs., less than 18 lbs, less than 20 lbs, etc.) are also contemplated. In some embodiments, the portable tubing bender 100 can include a belt clip 158 (depicted in FIG. 1) configured to enable the portable tubing bender 100 to be worn on the belt of a user. In other embodiments, the portable tubing bender 100 can be configured to be worn in a holster or other carrier. In both cases, the weight of the portable tubing bender 100 can be light enough to be comfortably worn by a user.

Figure 12:
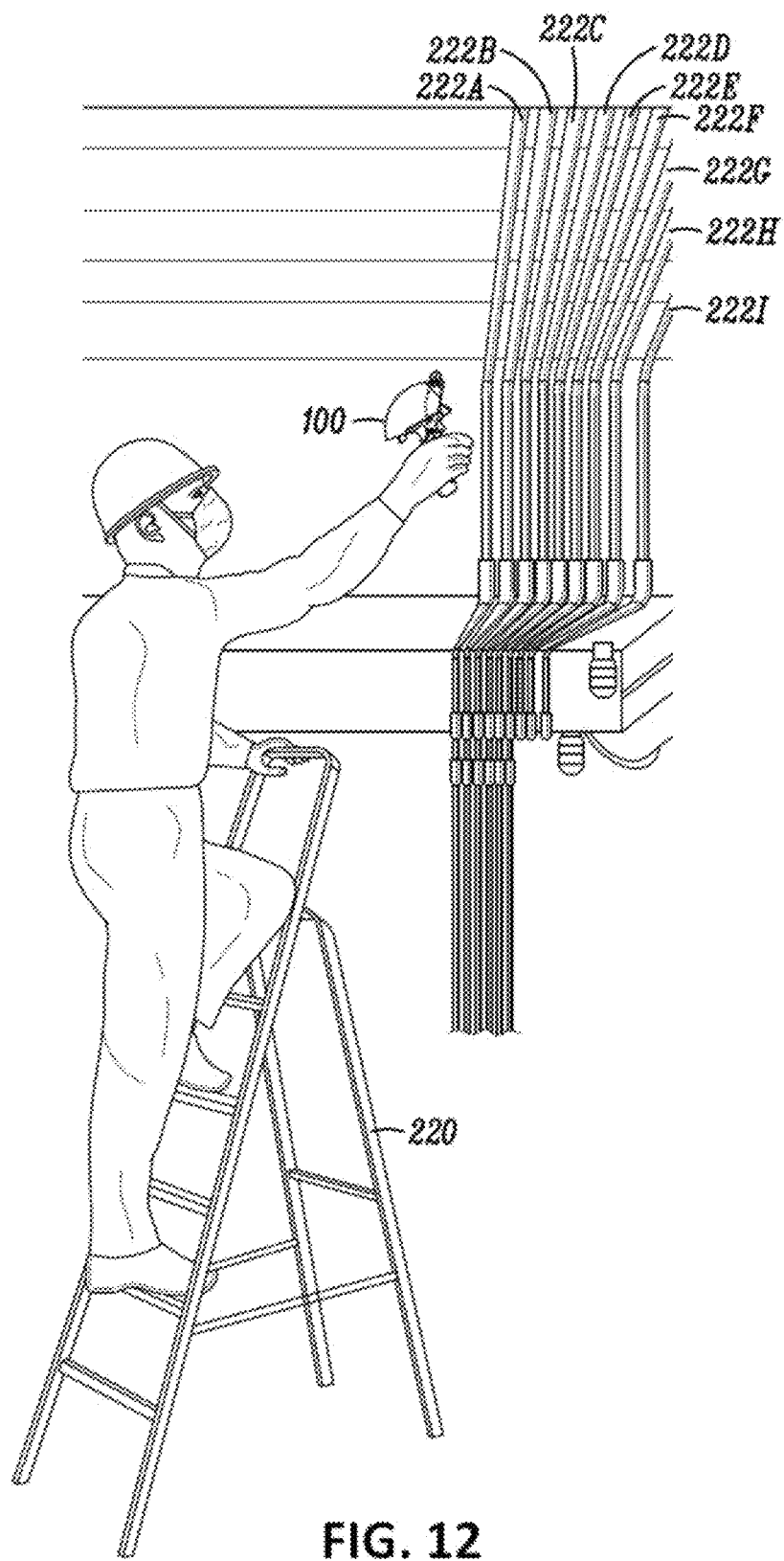
FIG. 12 is a perspective view of a user operating a portable tubing bender of the present disclosure with a single hand, while standing on a ladder maintaining three points of contact, in accordance with an embodiment of the disclosure.

With reference to FIG. 12, portable tubing benders 100 of the present disclosure can be constructed such that it is possible to operate the device 100 with a single hand. Accordingly, embodiments of the present disclosure enable the bending of conduit while working on a ladder 220, while also maintaining the OSHA three points of contact requirement (e.g., users can maintain two feet and a hand on the ladder at all times). For example, as depicted in FIG. 12, a user can bend and align multiple parallel sections of conduit 222A-I, in place (e.g., with the conduit positioned on a wall or ceiling), with a single hand.

Figure 13B:
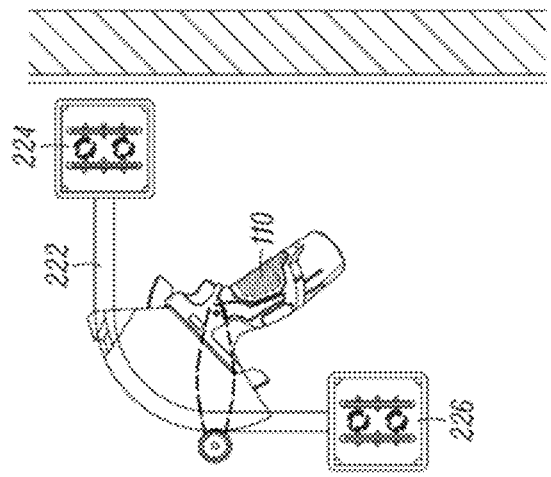
FIG. 13B is a profile view of the portable tubing bender of FIG. 13A within the installation environment after commencing a bending operation.
Figure 13A:
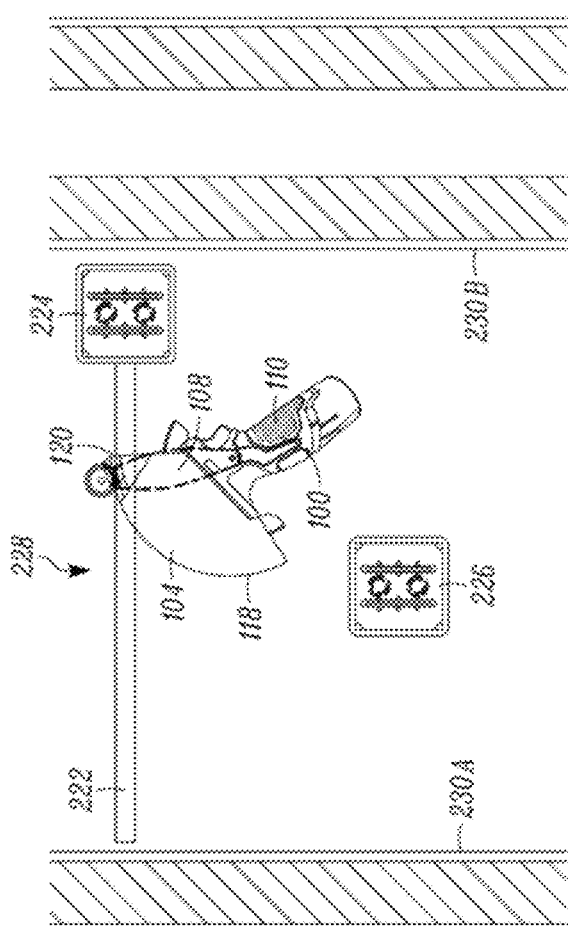
FIG. 13A is a profile view of a portable tubing bender of the present disclosure positioned on a length of tubing within an installation environment.

With reference to FIG. 13A, in operation, it may be desirable to bend a section of conduit 222 from a first junction box 224 (to which the conduit 222 is affixed), to a second junction box 226. Further, as is often the case, the available workspace 228 may be constrained within fixed structures 230A-B. Accordingly, as depicted in FIG. 13A, the conduit 222 can be positioned within the arcuate channel 118 of the bender shoe 104 and proximate to the hook 120. Thereafter, the guide frame 108 can be actuated to bend the conduit 222 according to the arc defined by the arcuate channel 118. As depicted in FIG. 13B, the result is the positioning of an approximately 90° bend in the conduit 222, thereby enabling the conduit 222 to be connected to the second junction box 226. Further, as can be seen in FIGS. 13A-B, the conduit 222 can be bent in place while keeping the handle portion 110 of the device 100 stationary with respect to the workspace 228 (e.g., a user does not need to guide the device along the conduit 222 or rotate the device with respect to the conduit 222 during bending operations). The same cannot be said for tubing benders like that shown in FIG. 11A.

For example, with reference to FIGS. 14A-B, bending the same section of conduit 222 from the first junction box 224 to the second junction box 226 between structural constraints 230A and 230B with a tubing bender 200 of the prior art requires a user to shift the device 200 along a longitudinal axis of the conduit 222 during the bending operation. Accordingly, unlike embodiments of the present disclosure, it is necessary to move the tubing bender 200 within the workspace 228 when bending conduit 222. Moving the tubing bender 200 during bending operations can present an additional challenge, particularly when working in a confined area. For example, as depicted in FIG. 14B, shifting the device 200 along the longitudinal axis of the conduit 222 causes the device 200 to contact the first junction box 224, thereby discouraging the tubing bender 200 from successfully completing the required bending operation, while the conduit 222 is in position.

With reference to FIGS. 15A-B, if a user were to attempt to keep the bender shoe 208 fixed in position relative to the workspace 228, the handle portion 210 would need to be pivoted about the bend in the conduit 222 as the bend occurs. Accordingly, even if this were possible to complete with a single hand, as depicted in FIG. 15B, pivoting the handle portion 210 causes the handle portion 210 to contact the structural constraint 230A, thereby discouraging the tubing bender 200 from successfully completing the required bending operation.

Accordingly, in addition to presenting a more compact, lighter weight, and better-balanced tubing bender 100, embodiments of the present disclosure enable the bending of a fixed section of conduit without the need to translate or rotate the handle portion 110 of the device 100 relative to the conduit 222. That is, once the device 100 is positioned relative to the conduit 222, and bending operations commence, the device 100 remains fixed in position relative to the conduit 222, which is an important aspect when working in a confined area or where a user's reach may be limited (e.g., on a ladder).

The invention is further illustrated by the following embodiments:

A portable tubing bender, comprising: a portable housing including a handle portion; a bender shoe operably coupled to the portable housing, the bender shoe defining an arcuate channel configured to restrain a length of tubing along a prescribed arc during bending operations; a guide gear fixedly coupled to the bender shoe; and a guide frame pivotably coupled to the bender shoe, the guide frame including a motor, a driven gear and a guide member, the motor configured to drive the driven gear along the guide gear to pivot the guide frame relative to the bender shoe, so as to move the guide member during bending operations to guide the length of tubing along the arcuate channel of the bender shoe.

A system or method according to any preceding embodiment, wherein the arcuate channel of the bender shoe is configured to receive at least one of Electrical Metallic Tubing (EMT), Rigid Metal Conduit (RMC), Intermediate Metal Conduit (IMC), PVC coated rigid metal conduit, copper tubing, aluminum tubing, stainless steel tubing, tubing used for HVAC or refrigeration systems, tubing used in elevator systems, or other types of tubing or conduit.

A system or method according to any embodiment, wherein the arcuate channel of the bender shoe is configured to receive EMT of a ½-inch designated standard size.

A system or method according to any embodiment, wherein the arcuate channel of the bender shoe is configured to receive EMT of a ¾-inch designated standard size.

A system or method according to any embodiment, wherein the bender shoe is a combination bender shoe defining a plurality of arcuate channels shaped and sized to receive tubing of different diameters.

A system or method according to any embodiment, wherein the bender shoe is configured to pivot or rotate relative to the portable housing.

A system or method according to any preceding embodiment, further comprising a rechargeable battery configured to power the motor.

A system or method according to any embodiment, wherein the guide member is configured to pivot relative to the bender shoe to complete a 90° bend in less than 10 seconds.

A system or method according to any embodiment, wherein an output speed of the motor is variable.

A system or method according to any embodiment, further comprising a worklight.

A system or method according to any embodiment, wherein the bender shoe includes markings configured to indicate a bend angle of the length of tubing during bending operations.

A system or method according to any embodiment, further comprising a sensor configured to sense an angular position of the guide frame relative to the bender shoe during bending operations.

A system or method according to any embodiment, further comprising a programmable controller configured to automatically cease operation of the motor upon reaching a desired angular position of the guide member relative to the bender shoe as determined by the sensor.

A system or method according to any embodiment, further comprising a display configured to display a digital readout of an angular position of the guide member relative to the bender shoe.

A system or method according to any embodiment, wherein the display further includes a user interface configured to accept a desired angular position of the guide member relative to the bender shoe.

A compact, lightweight, portable tubing bender system configured to enable one-handed operation, the tubing bender system comprising: a portable housing including a handle portion configured to receive a rechargeable battery; a bender shoe operably coupled to the portable housing, the bender shoe defining an arcuate channel configured to restrain a length of tubing along a prescribed arc during bending operations; a guide gear fixedly coupled to the bender shoe; and a guide frame pivotably coupled to the bender shoe, the guide frame including a motor, a driven gear and a guide member, the motor configured to drive the driven gear along the guide gear to pivot the guide frame relative to the bender shoe, so as to move the guide member during bending operations to guide the length of tubing along the arcuate channel of the bender shoe.

A system or method according to any embodiment, wherein the arcuate channel of the bender shoe is configured to receive at least one of Electrical Metallic Tubing (EMT), Rigid Metal Conduit (RMC), Intermediate Metal Conduit (IMC), PVC coated rigid metal conduit, copper tubing, aluminum tubing, stainless steel tubing, tubing used for HVAC or refrigeration systems, tubing used in elevator systems, or other types of tubing or conduit.

A system or method according to any embodiment, wherein the arcuate channel of the bender shoe is configured to receive at least one of EMT of a ½-inch or ¾-inch designated standard size.

A system or method according to any embodiment, wherein the guide member is configured to pivot relative to the bender shoe to complete a 90° bend in less than 10 seconds.

The portable tubing bender system of claim 16, wherein an output speed of the motor is variable.

A method of using a portable tubing bender to bend tubing with a single hand, the method comprising: positioning a length of tubing between a hook and an arcuate channel defined by a bender shoe; and pivoting a guide frame relative to the bender shoe, the guide frame including a motor, a driven gear and a guide member, the motor configured to drive the driven gear along a guide gear fixedly coupled to the bender shoe to pivot the guide frame relative to the bender shoe, so as to move the guide member during bending operations to guide the length of tubing along the arcuate channel of the bender shoe.

A reduced length portable tubing bender, comprising: a handle portion; a bender shoe and guide gear operably coupled to the handle portion, the bender shoe defining an arcuate channel configured to restrain a length of tubing along a prescribed arc during bending operations, the guide gear defining a central aperture positioned on the handle portion; and a guide frame pivotably coupled to the bender shoe, the guide frame configured to pivot relative to the bender shoe about the central aperture, so as to guide the length of tubing along the arcuate channel of the bender shoe.

A portable tubing bender configured to enable bending of a length of tubing, wherein a first end of the length of tubing is fixed in position relative to an installation environment, the portable tubing bender comprising: a bender shoe and handle portion, the bender shoe defining an arcuate channel configured to restrain a length of tubing along a prescribed arc during bending operations; and a guide frame pivotably coupled to the bender shoe, the guide frame configured to pivot relative to the bender shoe during bending operations to guide a portion of the length of tubing along the arcuate channel of the bender shoe; wherein the bender shoe and handle portion remain fixed in position relative to installation environment during bending operations.

A method of bending tubing comprising: positioning a length of tubing between a hook and an arcuate channel defined by a bender shoe; and pivoting a guide frame relative to the bender shoe to guide the length of tubing along the arcuate channel of the bender shoe, wherein the bender shoe remains fixed in position relative to an installation environment during bending operations.

A portable tubing bender, comprising: a portable housing including a handle portion; a bender shoe operably coupled to the portable housing, the bender shoe defining an arcuate channel configured to restrain a length of tubing along a prescribed arc during bending operations, one or more curved guide wheel channels, and a guide gear in the form of a partial ring gear; and a guide frame including one or more guide wheels configured to traverse along the one or more curved guide wheel channels, a driven gear configured to traverse along the guide gear, a motor configured to provide rotational power to a driven gear, and a guide member configured to guide the length of tubing along the arcuate channel of the bender shoe, wherein the motor is configured to drive the driven gear along the guide gear to pivot the guide frame relative to the bender shoe, so as to move the guide member during bending operations to guide the length of tubing along the arcuate channel of the bender shoe.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What is claimed is:

1. A portable tubing bender, comprising:
   a handle portion configured to enable the portable tubing bender to be supported with a single hand as a fixed frame of reference;
   a bender shoe operably coupled to the handle portion, the bender shoe defining an arcuate channel configured to restrain a length of tubing along a prescribed arc during bending operations;
   a guide gear fixedly coupled to the bender shoe; and
   a guide frame pivotably coupled to the bender shoe, the guide frame including a motor, a driven gear and a guide member, the motor configured to drive the driven gear along the guide gear to pivot the guide frame relative to the fixed frame of reference, to enable bending of the length of tubing around the handle portion.

2. The portable tubing bender of claim 1, wherein the arcuate channel of the bender shoe is configured to receive at least one of Electrical Metallic Tubing (EMT), Rigid Metal Conduit (RMC), Intermediate Metal Conduit (IMC), PVC coated rigid metal conduit, copper tubing, aluminum tubing, stainless steel tubing, tubing used for HVAC or refrigeration systems, or tubing used in elevator systems.

3. The portable tubing bender of claim 1, wherein the arcuate channel of the bender shoe is configured to receive EMT of a ½-inch designated standard size.

4. The portable tubing bender of claim 1, wherein the arcuate channel of the bender shoe is configured to receive EMT of a ¾-inch designated standard size.

5. The portable tubing bender of claim 1, wherein the bender shoe is a combination bender shoe defining a plurality of arcuate channels shaped and sized to receive tubing of different diameters.

6. The portable tubing bender of claim 1, wherein the bender shoe is configured to pivot relative to the handle portion.

7. The portable tubing bender of claim 1, further comprising a rechargeable battery configured to power the motor.

8. The portable tubing bender of claim 1, wherein the guide member is configured to pivot relative to the bender shoe to complete a 90° bend in less than 10 seconds.

9. The portable tubing bender of claim 1, wherein an output speed of the motor is variable.

10. The portable tubing bender of claim 1, further comprising a worklight.

11. The portable tubing bender of claim 1, wherein the bender shoe includes markings configured to indicate a bend angle of the length of tubing during bending operations.

12. The portable tubing bender of claim 1, further comprising a sensor configured to sense an angular position of the guide frame relative to the bender shoe during bending operations.

13. The portable tubing bender of claim 12, further comprising a programmable controller configured to automatically cease operation of the motor upon reaching a desired angular position of the guide member relative to the bender shoe as determined by the sensor.

14. The portable tubing bender of claim 1, further comprising a display configured to display a digital readout of an angular position of the guide member relative to the bender shoe.

15. The portable tubing bender of claim 14, wherein the display further includes a user interface configured to accept a desired angular position of the guide member relative to the bender shoe.

16. The portable tubing bender of claim 1, wherein the bender shoe is fixedly coupled to a top of the handle portion.

17. The portable tubing bender of claim 1, wherein the guide gear is a sectional gear representing an arc of between about 180° and about 250°.

18. The portable tubing bender of claim 1, wherein the guide frame is pivotably coupled to a single side of the bender shoe to enable ease in removal of the length of tubing upon the completion of bending operations.

19. The portable tubing bender of claim 1, wherein the guide frame at least partially houses the motor to provide a protective shroud to the motor.

20. The portable tubing bender of claim 1, wherein the guide frame includes an adjustment mechanism configured to enable adjustment of a distance of the guide member from the bender shoe.

21. The portable tubing bender of claim 1, wherein the bender shoe includes two or more nested arcuate channels configured to enable bending of two or more diameters of tubing with a single bender shoe.

22. A compact, lightweight, portable tubing bender system configured to enable one-handed operation, the tubing bender system comprising:
    a handle portion configured to enable the portable tubing bender to be supported with a single hand as a fixed frame of reference, the handle portion configured to receive a rechargeable battery;
    a bender shoe operably coupled to the handle portion, the bender shoe defining an arcuate channel configured to restrain a length of tubing along a prescribed arc during bending operations;
    a guide gear fixedly coupled to the bender shoe; and
    a guide frame pivotably coupled to the bender shoe, the guide frame including a motor, a driven gear and a guide member, the motor configured to drive the driven gear along the guide gear to pivot the guide frame relative to the fixed frame of reference, to enable bending of the length of tubing around the handle portion.

23. The portable tubing bender system of claim 22, wherein the arcuate channel of the bender shoe is configured to receive at least one of Electrical Metallic Tubing (EMT), Rigid Metal Conduit (RMC), Intermediate Metal Conduit (IMC), PVC coated rigid metal conduit, copper tubing, aluminum tubing, stainless steel tubing, tubing used for HVAC or refrigeration systems, or tubing used in elevator systems.

24. The portable tubing bender system of claim 22, wherein the arcuate channel of the bender shoe is configured to receive at least one of EMT of a ½-inch or ¾-inch designated standard size.

25. The portable tubing bender system of claim 22, wherein the guide member is configured to pivot relative to the bender shoe to complete a 90° bend in less than 10 seconds.

26. The portable tubing bender system of claim 22, wherein an output speed of the motor is variable.

27. A method of using a portable tubing bender to bend tubing with a single hand, the method comprising:
    positioning a length of tubing between a hook and an arcuate channel defined by a bender shoe, the bender shoe operably coupled to a single hand supported handle portion configured to enable single handed bending operations, wherein the bender shoe and single hand supported handle portion serve as a fixed frame of reference; and pivoting a guide frame relative to the bender shoe, the guide frame including a motor, a driven gear and a guide member, the motor configured to drive the driven gear along a guide gear fixedly coupled to the bender shoe to pivot the guide frame relative to the fixed frame of reference, to enable bending of the length of tubing around the single hand supported handle portion.

\* \* \* \* \*